US012010276B2

(12) United States Patent
Mizuno

(10) Patent No.: US 12,010,276 B2
(45) Date of Patent: Jun. 11, 2024

(54) IMAGE PROCESSING APPARATUS, CONTROL METHOD FOR CONTROLLING IMAGE PROCESSING APPARATUS, AND STORAGE MEDIUM FOR SETTING A SETTING VALUE

(71) Applicant: CANON KABUSHIKI KAISHA, Tokyo (JP)

(72) Inventor: Takafumi Mizuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/181,420

(22) Filed: Mar. 9, 2023

(65) Prior Publication Data

US 2023/0300265 A1 Sep. 21, 2023

(30) Foreign Application Priority Data

Mar. 16, 2022 (JP) .................................. 2022-041323

(51) Int. Cl.
*H04N 1/00* (2006.01)
(52) U.S. Cl.
CPC ..... *H04N 1/00501* (2013.01); *H04N 1/00474* (2013.01); *H04N 1/00482* (2013.01); *H04N 1/0097* (2013.01)
(58) Field of Classification Search
USPC .................................................. 358/1.16, 358
See application file for complete search history.

(56) References Cited

U.S. PATENT DOCUMENTS

| 2010/0235883 | A1* | 9/2010 | Sato | H04N 1/00482 |
| | | | | 715/740 |
| 2014/0033090 | A1* | 1/2014 | Yamada | G06F 3/1238 |
| | | | | 715/764 |
| 2014/0123210 | A1* | 5/2014 | Tsuchitoi | G06F 21/57 |
| | | | | 726/1 |
| 2014/0310767 | A1* | 10/2014 | Nishimura | H04L 63/20 |
| | | | | 726/1 |
| 2017/0094121 | A1* | 3/2017 | Mizuno | H04N 1/4433 |
| 2018/0063376 | A1* | 3/2018 | Ohara | H04N 1/00482 |
| 2020/0344372 | A1* | 10/2020 | Nakazawa | H04N 1/00856 |
| 2021/0081152 | A1* | 3/2021 | Tanaka | G06F 3/1222 |
| 2022/0078291 | A1* | 3/2022 | Yoshimi | H04N 1/0097 |

FOREIGN PATENT DOCUMENTS

JP 2020154832 A 9/2020

* cited by examiner

*Primary Examiner* — Henok Shiferaw
(74) *Attorney, Agent, or Firm* — Canon U.S.A., Inc. IP Division

(57) ABSTRACT

An image processing apparatus includes a storage unit that stores a first and a second setting item group in association with a first and a second use environment, respectively, included in a plurality of use environments, a reception unit that receives a selection regarding the plurality of use environments from a user, a setting unit that sets the image processing apparatus using a plurality of setting values corresponding to a use environment identified by the selection, and an output unit that outputs the first setting item group in a case where the use environment is the first use environment, and outputs the second setting item group in a case where the use environment is the second use environment, wherein a plurality of setting items corresponding to the plurality of setting values used by the setting unit is not included in the first and second setting item groups.

11 Claims, 19 Drawing Sheets

FIG.3

| USE ENVIRONMENT | | | FUNCTION | ESSENTIAL SETTING ITEM | SETTING VALUE |
|---|---|---|---|---|---|
| COMPANY INTRANET/ INTERNET DIRECT CONNECTION/HIGHLY CONFIDENTIAL INFORMATION MANAGEMENT | INTERNET PROHIBITION | IN-HOME | FAX | CONFIRMATION WHEN FREQUENTLY USED SETTING IS CALLED | ENABLED |
| | | | FAX | CONFIRMATION WHEN FAX NUMBER IS INPUT | ENABLED |
| | | PUBLIC SPACE | FAX | CONFIRMATION IN CASE WHERE FAX DESTINATION IS INCLUDED | ENABLED |
| | | | TRANSMISSION | CONFIRMATION WHEN FREQUENTLY USED SETTING IS CALLED | ENABLED |
| | | | TRANSMISSION | S/MIME SETTING | ENABLED |
| | | | TRANSMISSION | ENCRYPTED PDF SETTING | ENABLED |
| | | | TRANSMISSION | ALWAYS ADD DEVICE SIGNATURE WHEN TRANSMISSION IS MADE | ENABLED |
| | | | BOX | ENCRYPTED PDF SETTING | ENABLED |
| | | PUBLIC SPACE | BOX | ALWAYS ADD DEVICE SIGNATURE WHEN TRANSMISSION IS MADE | ENABLED |
| | | | FAX | FAX RECEPTION RESULT REPORT | NOT OUTPUT |
| | | | FAX | FAX BOX RECEPTION REPORT | NOT OUTPUT |
| | | | FAX | FAX TRANSMISSION RESULT REPORT | NOT OUTPUT |
| | | | TRANSMISSION | FAX COMMUNICATION MANAGEMENT REPORT | NOT OUTPUT |
| | | | TRANSMISSION | TRANSMISSION RESULT REPORT | NOT OUTPUT |
| | | | TRANSMISSION | COMMUNICATION MANAGEMENT REPORT | NOT OUTPUT |
| | | | PRINT | FORCED RESERVATION | ENABLED |
| | | | PRINT | RECEIVE ONLY ENCRYPTED SECURE JOB | ENABLED |

FIG.4

| USE ENVIRONMENT (301) | | | FUNCTION (302) | OPTIONAL SETTING ITEM (403) | SETTING VALUE (404) |
|---|---|---|---|---|---|
| COMPANY INTRANET/ INTERNET DIRECT CONNECTION/HIGHLY CONFIDENTIAL INFORMATION MANAGEMENT | IN-HOME | PUBLIC SPACE | FAX | RESTRICT SIMULTANEOUS TRANSMISSION INCLUDING FAX DESTINATION | ENABLED |
| | | | FAX | PERMIT TRANSMISSION BY USER WHOSE EMAIL ADDRESS IS NOT REGISTERED | DISABLED |
| | | | TRANSMISSION | RESTRICT NEW DESTINATION | ENABLED |
| | | | TRANSMISSION | RESTRICT EMAIL TRANSMISSION TO "TRANSMIT TO MYSELF" | ENABLED |
| | | | TRANSMISSION | RESTRICT FILE TRANSMISSION TO "MY FOLDER" | ENABLED |
| | | | TRANSMISSION | CONFIRM CERTIFICATE WHEN WebDAV TRANSMISSION IS MADE | ENABLED |
| | | | TRANSMISSION | CONFIRM CERTIFICATE WHEN FTPS TRANSMISSION IS MADE | ENABLED |
| | | | TRANSMISSION | CONFIRM CERTIFICATE WHEN SMTP TRANSMISSION IS MADE | ENABLED |
| | | | BOX | CONFIRM CERTIFICATE WHEN POP RECEPTION IS MADE | ENABLED |
| | | | FAX | CONFIRM CERTIFICATE WHEN NETWORK ACCESS IS MADE | ENABLED |
| | | | FAX | USE FAX MEMORY RECEPTION | ENABLED |
| | | | PRINT | USE I-FAX MEMORY RECEPTION | ENABLED |
| | | | PRINT | USE AUTOMATIC PRINT FUNCTION WHEN LOGIN IS PERFORMED | DISABLED |
| | | | FAX | AUTOMATICALLY PRINT MY JOB WHEN LOGIN IS PERFORMED | DISABLED |
| | | | BOX | PERMIT TRANSMISSION FROM FAX DRIVER | DISABLED |
| | | | BOX | EXTERNAL DISCLOSURE SETTING | DISABLED |
| | | | | USE MEMORY MEDIUM FUNCTION | DISABLED |

FIG.8

| DATE AND TIME | APP NAME |
|---|---|
| 2021/10/12 10:15 | TRANSMISSION APP |
| 2021/10/10 9:48 | FAX APP |
| 2021/10/2 17:19 | COPY APP |
| 2021/10/2 12:03 | FAX APP |
| 2021/9/30 19:21 | FAX APP |
| 2021/9/29 10:52 | TRANSMISSION APP |
| ... | ... |

FIG.10A

| APP NAME | STATE | CAUSE |
|---|---|---|
| TRANSMISSION APP | USABLE | |
| FAX APP | UNUSABLE | FAX BOARD ABSENT |
| BOX APP | USABLE | |
| COPY APP | USABLE | |
| PRINT APP A | UNUSABLE | LICENSE ABSENT |
| PRINT APP B | USABLE | |

| APP NAME | STATE | CAUSE |
|---|---|---|
| TRANSMISSION APP | USABLE | |
| FAX APP | UNUSABLE | FAX BOARD ABSENT |
| BOX APP | UNUSED | UNUSED |
| COPY APP | USABLE | |
| PRINT APP A | UNUSABLE | LICENSE ABSENT |
| PRINT APP B | USABLE | |

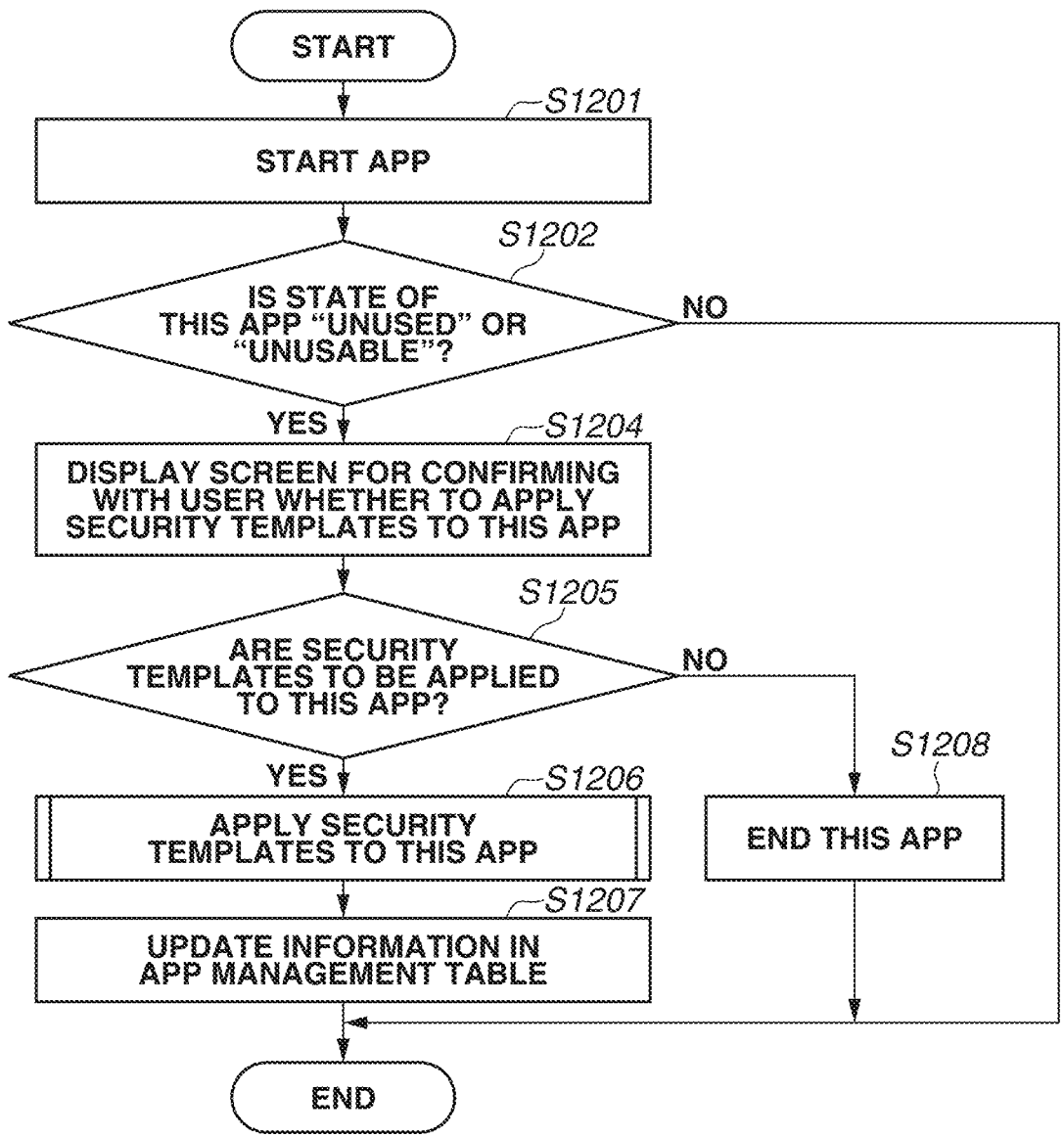

FIG.13

| USE ENVIRONMENT | | | FUNCTION (302) | OPTIONAL SETTING ITEM (403) | SETTING VALUE (404) | TYPE |
|---|---|---|---|---|---|---|
| COMPANY INTRANET/ INTERNET DIRECT CONNECTION/HIGHLY CONFIDENTIAL INFORMATION MANAGEMENT | INTERNET PROHIBITION | | FAX | RESTRICT SIMULTANEOUS TRANSMISSION INCLUDING FAX DESTINATION | ENABLED | TRANSMISSION RESTRICTION |
| | | | FAX | RESTRICT TRANSMISSION BY USER WHOSE EMAIL ADDRESS IS NOT REGISTERED | ENABLED | ADDRESS BOOK RESTRICTION |
| | IN-HOME | | TRANSMISSION | RESTRICT NEW DESTINATION | ENABLED | TRANSMISSION RESTRICTION |
| | | | TRANSMISSION | RESTRICT EMAIL TRANSMISSION TO "TRANSMIT TO MYSELF" | ENABLED | TRANSMISSION RESTRICTION |
| | | PUBLIC SPACE | TRANSMISSION | RESTRICT FILE TRANSMISSION TO "MY FOLDER" | ENABLED | TRANSMISSION RESTRICTION |
| | | | TRANSMISSION | CONFIRM CERTIFICATE WHEN WebDAV TRANSMISSION IS MADE | ENABLED | CERTIFICATE CONFIRMATION |
| | | | TRANSMISSION | CONFIRM CERTIFICATE WHEN FTPS TRANSMISSION IS MADE | ENABLED | CERTIFICATE CONFIRMATION |
| | | | TRANSMISSION | CONFIRM CERTIFICATE WHEN SMTP TRANSMISSION IS MADE | ENABLED | CERTIFICATE CONFIRMATION |
| | | | TRANSMISSION | CONFIRM CERTIFICATE WHEN POP RECEPTION IS MADE | ENABLED | CERTIFICATE CONFIRMATION |
| | | | BOX | CONFIRM CERTIFICATE WHEN NETWORK ACCESS IS MADE | ENABLED | CERTIFICATE CONFIRMATION |
| | | | FAX | USE FAX MEMORY RECEPTION | ENABLED | MEMORY RECEPTION |
| | | | FAX | USE I-FAX MEMORY RECEPTION | ENABLED | MEMORY RECEPTION |
| | | | PRINT | USE AUTOMATIC PRINT FUNCTION WHEN LOGIN IS PERFORMED | DISABLED | AUTOMATIC PRINTING |
| | | | PRINT | AUTOMATICALLY PRINT MY JOB WHEN LOGIN IS PERFORMED | DISABLED | AUTOMATIC PRINTING |
| | | | FAX | PERMIT TRANSMISSION FROM FAX DRIVER | DISABLED | EXTERNAL OPERATION |
| | | | BOX | EXTERNAL DISCLOSURE SETTING | DISABLED | EXTERNAL OPERATION |
| | | | BOX | USE MEMORY MEDIUM FUNCTION | DISABLED | EXTERNAL OPERATION |

(301)

IMAGE PROCESSING APPARATUS, CONTROL METHOD FOR CONTROLLING IMAGE PROCESSING APPARATUS, AND STORAGE MEDIUM FOR SETTING A SETTING VALUE

BACKGROUND

Field of the Disclosure

The present disclosure relates to an image processing apparatus that collectively sets a plurality of setting items.

Description of the Related Art

Generally, an image processing apparatus has a setting function for making various settings based on user operations. Examples of the various settings include a setting regarding security. Japanese Patent Application Laid-Open No. 2020-154832 discusses a technique for collectively making security settings for a plurality of image processing apparatuses, thereby reducing the operation time of a user required for settings.

If attention is paid to the use environment of the image processing apparatus, the image processing apparatus has been increasingly installed in various environments such as an in-home work environment and a public space shared by many and unspecified people, and required settings have become complex. Japanese Patent Application Laid-Open No. 2020-154832, however, does not consider making settings suitable for the use environment of each image processing apparatus. Thus, there is a possibility that the user does not know which setting item should be set for the use environment of the image processing apparatus.

SUMMARY

For example, as the settings suitable for the use environment, a security setting for an application individually installed on the image processing apparatus and a setting that requires confirmation of the user should be considered.

Embodiments of the present disclosure are directed to providing a mechanism for assisting a setting so that a setting value corresponding to a setting item included in an image processing apparatus is a setting value suitable for the use environment of the image processing apparatus.

According to embodiments of the present disclosure, an image processing apparatus includes a storage unit configured to store a first setting item group in association with a first use environment included in a plurality of use environments and store a second setting item group in association with a second use environment included in the plurality of use environments, a reception unit configured to receive a selection regarding the plurality of use environments from a user, a setting unit configured to set the image processing apparatus using a plurality of setting values corresponding to a use environment identified by the selection, and an output unit configured to output the first setting item group in a case where the use environment identified by the selection is the first use environment, and output the second setting item group in a case where the use environment identified by the selection is the second use environment, wherein a plurality of setting items corresponding to the plurality of setting values used by the setting unit is not included in the first and second setting item groups.

Further features of the present disclosure will become apparent from the following description of exemplary embodiments with reference to the attached drawings.

BRIEF DESCRIPTION OF THE DRAWINGS

FIG. 3 illustrates examples of essential security templates used for security settings.

FIG. 4 illustrates examples of optional security templates used for security settings.

FIG. 8 is an example of application history used in a second exemplary embodiment.

FIGS. 10A and 10B are examples of an app management table used in the second exemplary embodiment.

FIG. 12 is a flowchart illustrating an example of a security setting process at the time of starting an application to be newly used in the second exemplary embodiment.

FIG. 13 illustrates examples of optional security templates used for security settings according to a third exemplary embodiment.

DESCRIPTION OF THE EMBODIMENTS

Exemplary embodiments of the present disclosure will be described below with reference to the drawings. The following exemplary embodiments do not limit the disclosure, and not all the combinations of the features described in the exemplary embodiments are essential for a method for solving the issues in the present disclosure.

Figure 1:
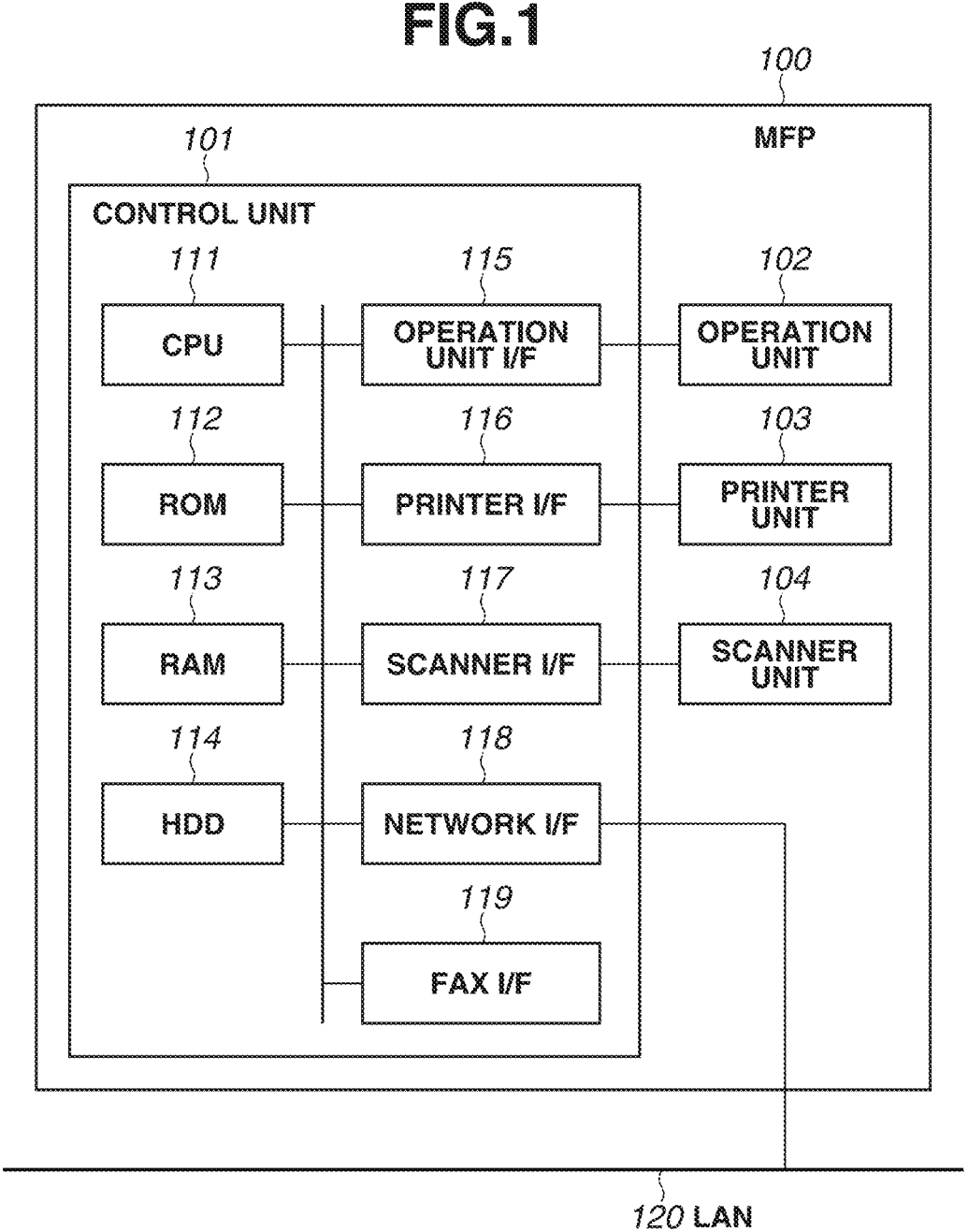
FIG. 1 is a diagram illustrating an example of a hardware configuration of a multifunction peripheral (MFP).

FIG. 1 is a diagram illustrating the hardware configuration of a multifunction peripheral (MFP) 100 as an example of an image processing apparatus according to a first exemplary embodiment. The MFP 100 includes an operation unit 102 that functions as a display unit that displays information to a user and a reception unit that receives an instruction from the user. The MFP 100 also includes a printer unit 103 that outputs electronic data to a paper medium, and a scanner unit 104 that reads a paper medium and converts a read image into electronic data. The operation unit 102, the printer unit 103, and the scanner unit 104 are connected to a control unit 101 and implement respective functions of the multifunction peripheral according to control of the control unit 101. Although the MFP 100 having a plurality of functions is illustrated as an example of the image processing apparatus in the present exemplary embodiment, the present exemplary embodiment is not limited to this. For example, the image processing apparatus may be an apparatus such as a single-function scanner or a single-function printer, or may be an apparatus such as a three-dimensional (3D) printer or a 3D scanner.

The control unit 101 controls the operation of the entirety of the MFP 100. A read-only memory (ROM) 112 is used to store programs to be executed by a central processing unit (CPU) 111. The CPU 111 reads control programs stored in the ROM 112 and performs various types of control of the MFP 100, such as reading control and transmission control. A random-access memory (RAM) 113 is used as a temporary storage area such as a main memory or a work area for the CPU 111. A hard disk drive (HDD) 114 is a storage device that stores image data, various programs, and various pieces of setting information. Alternatively, the control unit 101 may include another storage device such as a solid-state drive (SSD). Pieces of hardware such as the CPU 111, the ROM 112, the RAM 113, and the HDD 114 thus form a computer.

An operation unit interface (I/F) 115 connects the operation unit 102 and the control unit 101.

The operation unit 102 includes a liquid crystal display unit having a touch panel function, and various hardware keys. The CPU 111 displays information to the user and receives an instruction from the user via the operation unit I/F 115.

A printer I/F 116 connects the printer unit 103 and the control unit 101. Based on print data input via the printer I/F 116, the MFP 100 performs the process of outputting the print data to a paper medium.

A scanner I/F 117 connects the scanner unit 104 and the control unit 101. The scanner unit 104 reads a document placed on a document platen (not illustrated), thereby generating image data.

A network cable is connected to a network I/F 118, and the network I/F 118 can communicate with an external apparatus on a local area network (LAN) 120. Although the network I/F 118 is assumed to be a communication interface that performs wired communication in the present exemplary embodiment, the exemplary embodiment is not limited to this. For example, the network I/F 118 may be a wireless communication interface.

A telephone network (not illustrated) is connected to a fax I/F 119. The fax I/F 119 transfers a fax to a telephone number for fax via the telephone network. The fax transmission via the telephone line is merely an example, and Internet fax may be used.

Figure 2:
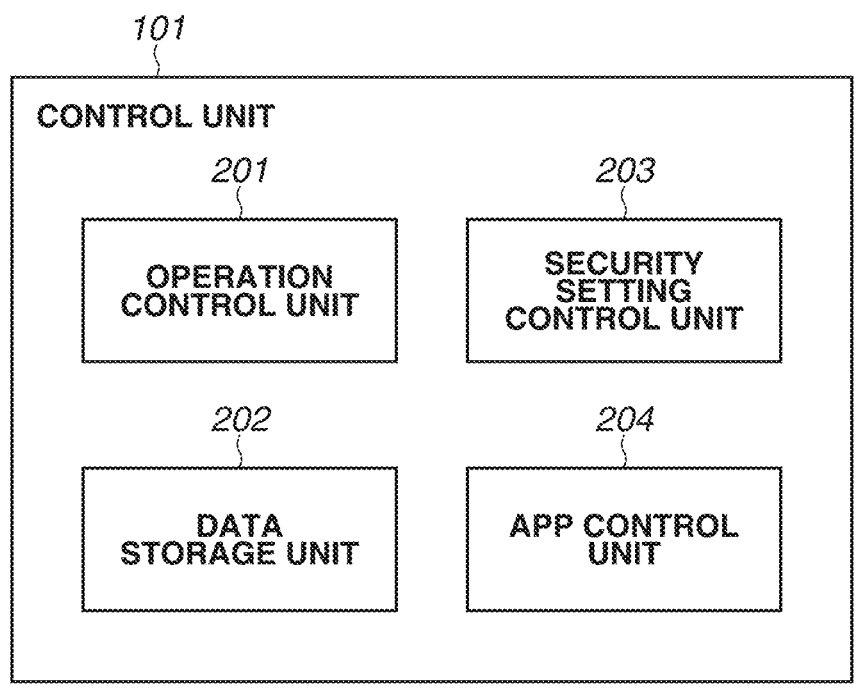
FIG. 2 is a diagram illustrating an example of a software configuration of the MFP.

FIG. 2 is a diagram illustrating the software configuration of the MFP 100. Components illustrated in FIG. 2 are implemented by the CPU 111 executing programs according to the present exemplary embodiment stored in the ROM 112.

An operation control unit 201 displays a screen for the user on the operation unit 102. The operation control unit 201 also detects an operation performed by the user, and switches the screen or updates the display based on the result of the detection.

According to a request from another control unit, a data storage unit 202 stores data in the HDD 114 or reads data from the HDD 114. The data storage unit 202 stores information regarding security settings in addition to setting information for determining the operation of the MFP 100.

The information regarding the security settings stored in the data storage unit 202 in the present exemplary embodiment will be described below with reference to FIGS. 3 and 4.

According to an instruction from the user that is detected by the operation control unit 201, a security setting control unit 203 makes security settings of the MFP 100. In the present exemplary embodiment, the security setting control unit 203 applies "essential security templates" described below with reference to FIG. 3 to the MFP 100. Based on "optional security templates" described below with reference to FIG. 4, the security setting control unit 203 also applies a recommended setting value of a template to the MFP 100 while confirming with the user via the operation unit 102 whether to apply the recommended setting value. The specific setting control process according to the present exemplary embodiment will be described below with reference to FIG. 7. Collective setting for applying the "essential security templates" in the present exemplary embodiment is a function capable of collectively setting recommended setting values of a typical security function defined by a vendor. This function is different in nature from the function of prohibiting a security policy edited by the user from being applied and the setting of a particular security setting item from being changed to a setting that does not match a policy.

An application control unit 204 controls applications (hereinafter abbreviated and referred to as "apps") of the MFP 100. The apps provide various functions to the user. Examples of the functions include a copy function, a transmission function, a fax function, a box function, and a print function. The app control unit 204 provides these functions to the user via the I/Fs. The specific control is described below on a function-by-function basis.

To provide the copy function to the user, the app control unit 204 receives an instruction to execute copying from the user via the operation unit I/F 115. If the app control unit 204 receives the instruction, the app control unit 204 reads a document in the scanner unit 104 via the scanner I/F 117 and receives image data. Then, the app control unit 204 performs a color conversion process on the received image data to be suitable for outputting. Finally, the app control unit 204 transfers the image data subjected to the color conversion process to the printer unit 103, and the printer unit 103 outputs the image data to a paper medium.

To provide the transmission function to the user, the app control unit 204 receives an instruction to execute transmission from the user via the operation unit I/F 115. At this time, in addition to the instruction to execute transmission, the app control unit 204 also receives a transmission protocol, designation of a transmission destination, and an instruction related to an image format. The transmission protocol is a communication standard for transmitting data. Examples of the transmission protocol include the File Transfer Protocol (FTP), which is a standard for transferring a file, and Server Message Block (SMB), which is a standard for sharing a file. The designation of a transmission destination refers to designation of a folder or a file as a transmission destination.

For example, the transmission destination is specified by a notation method termed Universal Naming Convention (UNC). Examples of the image format include the Joint Photographic Experts Group (JPEG) and Portable Document Format (PDF). If the app control unit 204 receives the instruction to execute transmission from the user, the app control unit 204 reads a document in the scanner unit 104 via the scanner I/F 117 and receives image data. Then, the app control unit 204 performs a conversion process for converting the received image data into the image format indicated by the user. Finally, the app control unit 204 transmits the image data subjected to the conversion process to the transmission destination using the transmission protocol specified by the user via the network I/F 118.

To provide the fax function to the user, the app control unit 204 receives an instruction to execute fax communication from the user via the operation unit I/F 115. At this time, in addition to the instruction to execute fax communication, the app control unit 204 also receives designation of a telephone number for fax as a transfer destination. If the app control unit 204 receives the instruction and the designation, the app control unit 204 reads a document in the scanner unit 104 via the scanner I/F 117 and receives image data. Then, the app control unit 204 performs a conversion process for converting the received image data into an image format for fax. Finally, the app control unit 204 transfers the image data to the telephone number designated by the user via the fax I/F 119.

The box function is the function of saving scanned image data in a storage area within the MFP 100 or a memory medium connected to the MFP 100. To provide the box function to the user, the app control unit 204 receives an instruction to scan a document and save image data in a box from the user via the operation unit I/F 115. In this instruction, the app control unit 204 receives designation of a save location and an image format of the scanned image from the user. In the designation of the save location, the user designates a path to a storage area within the MFP 100 or the memory medium connected to the MFP 100. Examples of the image format include JPEG and PDF. If the app control unit 204 receives the instruction and the designation, the app control unit 204 reads a document in the scanner unit 104 via the scanner I/F 117 and receives image data. Then, the app control unit 204 performs a conversion process for converting the received image data into the image format designated by the user. Finally, the app control unit 204 transfers the image data subjected to the conversion process to the save location designated by the user. In a case where the MFP 100 serves as a file server such as an SMB server, the box function can disclose the data saved in the MFP 100 to an external personal computer (PC) or another MFP (not illustrated). To provide this function to the user, the app control unit 204 receives a request to externally access the box via the network I/F 118. This request includes a path to an image file at the access destination. The app control unit 204 transfers the image data corresponding to the specified path to the image file, to the requester having requested the access via the network I/F 118.

For example, the print function is the function of not immediately printing print data but temporarily reserving the print data in the MFP 100 when the MFP 100 receives the print data from an external PC (not illustrated), and then printing the print data in response to an instruction from the user. The MFP 100 receives the print data received from the external PC via the network I/F 118 and saves the print data in the HDD 114. To provide the print function to the user, the app control unit 204 receives an instruction to execute printing from the user via the operation unit I/F 115. At this time, in addition to the instruction to execute printing, the printer unit 103 also receives user information. The app control unit 204 transfers print data that matches the received user information among pieces of print data saved in the HDD 114 to the printer unit 103 via the printer I/F 116, and the printer unit 103 outputs the print data to a paper medium.

The above functions are merely examples of the functions of the MFP 100, and the MFP 100 may have another function.

FIGS. 3 and 4 illustrate setting data groups regarding security settings stored in the data storage unit 202 in the present exemplary embodiment. FIG. 3 illustrates use environments 301 of the MFP 100. In the present exemplary embodiment, the environment where the MFP 100 is used is divided into six environments: a company intranet environment, an Internet direct connection environment, an Internet prohibition environment, an in-home environment, a public space environment, and a highly confidential information management environment. FIG. 3 illustrates essential setting items 303 that are required be set in each use environment, and setting values 304. Each function 302 indicates a function to which each essential setting item corresponds, among the functions provided by the apps. In the company intranet environment, the Internet direct connection environment, and the highly confidential information management environment, setting values corresponding to all setting items illustrated in FIG. 3 are required to be set. In the Internet prohibition environment, setting values illustrated in FIG. 3 corresponding to setting items other than "receive only encrypted secure job" indicated by an oblique line are required to be set among the setting items illustrated in FIG. 3. Also in the in-home environment and the public space environment, similarly, setting values corresponding to setting items other than items indicated by oblique lines are required to be set. In the present exemplary embodiment, such a collection of data on setting items that are required to be set and setting values for each use environment is referred to as a "security template". A plurality of setting items and the setting values of the setting items are stored as a template in association with a predetermined use environment such as the company intranet environment, the in-home environment, or the public space environment in the data storage unit 202. Templates illustrated in FIG. 3 are referred to as "essential security templates". In the present exemplary embodiment, if the user selects one of the six use environments, the essential security template associated with the selected use environment is applied. Specifically, setting values 304 are collectively applied for setting items 303 included in the essential security template associated with the selected use environment.

The setting items 303 are described below. "Confirmation when frequently used setting is called" in the fax function or the transmission function is an item for, before transmission is actually made, displaying a confirmation screen regarding a transmission destination registered as a frequently used setting so that transmission to the transmission destination can be made with a single touch. "Confirmation when fax number is input" in the fax function is an item for displaying a confirmation screen after a fax number is manually input. "Confirmation in case where fax destination is included" is an item for displaying a confirmation screen in a case where a fax destination is included in a transmission destination. The above setting items are setting items regarding erroneous transmission, and are set to "enabled" to prevent transmission to a wrong transmission destination as much as possible.

"S/MIME setting" in the transmission function is a setting item for encrypting an email. "Encrypted PDF setting" in the transmission function or the box function is an item for setting the encryption strength of encrypted PDF. "Always add device signature when transmission is made" is an item for making a setting to always add a device signature when a PDF file or an Extensible Markup Language Paper Specification (XPS) file is transmitted. The above setting items are setting items regarding document security, and are set to "enabled" to enhance the security of a document to be transmitted or saved by the transmission function or the box function.

"Fax reception result report", "fax box reception report", "fax transmission result report", and "fax communication management report" in the fax function are described. These setting items are items for setting whether to print a result related to a fax such as the result of the reception or transmission of a fax or fax history as a report. Similarly, "transmission result report" and "communication management report" in the transmission function are also items for setting whether to print transmitted content or transmission history as a report. The above setting items are setting items regarding prevention of printed paper from being left, and are set to "not output" to prevent information from leaking in a case where printed paper is left for a long period of time. "Forced reservation" in the print function is an item for setting whether to forcibly reserve print data when printing is performed via a driver from an external PC. This setting item is also a setting item regarding prevention of printed paper from being left.

"Receive only encrypted secure job" in the print function is an item for setting whether to receive only an encrypted high-security job. This setting item is a setting item regarding an operation restriction, and is set to "enabled" to restrict an inadvertent operation from being performed.

FIG. 4 illustrates optional setting items 403 that are recommended to be set in each use environment, and setting values 404. These settings are similar in the use environments 301 and the functions 302 to those in FIG. 3. In the company intranet environment, the Internet direct connection environment, and the highly confidential information management environment, setting values corresponding to all setting items illustrated in FIG. 4 are recommended to be set. In the Internet prohibition environment, the in-home environment, and the public space environment, setting values corresponding to setting items other than items indicated by oblique lines are recommended to be set. In the present exemplary embodiment, templates illustrated in FIG. 4 are referred to as "optional security templates". In the present exemplary embodiment, if the user selects one of the six use environments, then a confirmation screen is displayed to confirm whether to apply the setting value in the template for each of the setting items included in the optional security template associated with the selected use environment. The user selects whether to apply the setting value on the confirmation screen, thereby setting the setting item.

The setting items 403 are described below. "Restrict simultaneous transmission including fax destination" in the fax function is a setting item regarding simultaneous transmission for simultaneously transmitting faxes to a plurality of destinations. If "restrict simultaneous transmission including fax destination" is set to "enabled", a setting is made to prohibit simultaneous transmission. "Permit transmission by user whose email address is not registered" in the fax function is an item for setting whether to permit a user whose email address is not registered to transmit an email in a case where individual authentication management is used as a login service. If "permit transmission by user whose email address is not registered" is set to "disabled", only a user whose email address is registered can transmit an email. "Restrict new destination" in the transmission function is a setting item for prohibiting a new destination from being input so that transmission to only a destination registered in advance can be made, thereby preventing a transmission destination from being erroneously input. "Restrict email transmission to 'transmit to myself'" is an item for, when an image is transmitted by email, prohibiting the image from being transmitted to a destination other than an email address assigned in advance to the user. Similarly, "restrict file transmission to 'my folder'" is also an item for prohibiting an image from being transmitted to a destination other than a folder in an external file server assigned in advance to the user. The above setting items are setting items regarding erroneous transmission prevention.

"Confirm certificate when WebDAV transmission is made" in the transmission function is an item for setting whether to confirm whether a certificate is legitimate when communication is performed according to the Web Distributed Authoring and Versioning (WebDAV) protocol.

Similarly, "confirm certificate when FTPS transmission is made", "confirm certificate when SMTP transmission is made", and "confirm certificate when POP reception is made" in the transmission function and "confirm certificate when network access is made" in the box function are also items for setting whether to confirm whether a certificate is legitimate when communication is performed according to each protocol. The above setting items are setting items regarding certificate confirmation for confirming a certificate when transmission or reception is made so as to confirm the legitimacy of a communication destination.

"Use fax memory reception" and "use I-fax memory reception" in the fax function are setting items for, when a fax or an I-fax is received, not printing data on paper but recording the data on a memory. "Use automatic print function when login is performed" in the print function is an item for setting whether to permit a forced reservation printing job to be automatically printed when a user logs in. "Automatically print my job when login is performed" is an item for each user logged in using the individual authentication management to set whether to perform automatic printing in a case where "use automatic print function when login is performed" is enabled. These two items in the print function are set to "disabled", whereby, when a user logs in and even if print data associated with the logged-in user is reserved, it is possible to prevent the print data from being automatically printed. The above setting items in the fax function and the print function are setting items regarding prevention of printed paper from being left.

"Permit transmission from fax driver" in the fax function is an item for setting whether to permit fax transmission from a computer using a fax driver. "External disclosure setting" in the box function is an item for setting whether to disclose internal storage of the MFP to the outside. "Use memory medium function" is a setting item regarding a memory medium function. The memory medium function refers to the function of enabling read image data to be saved in a memory medium or enabling a file in the memory medium to be printed by connecting the memory medium to a Universal Serial Bus (USB) port. By setting this item is set to "disabled", it is possible to make a setting to prohibit the use of the memory medium. The above setting items are setting items regarding an operation restriction.

In the present exemplary embodiment, setting data groups stored in the data storage unit 202 are security setting data groups regarding the apps of the MFP 100 as illustrated in FIGS. 3 and 4. These security setting data groups, however, are merely examples of the setting data groups, and are not limited to data groups regarding the apps. For example, a security setting data group related to a system in general such as a network may be stored in the data storage unit 202. Then, in the flow of a setting procedure described below with reference to FIG. 7, security settings related to the system in general such as the network may be made instead of security settings regarding the apps.

Figure 5:
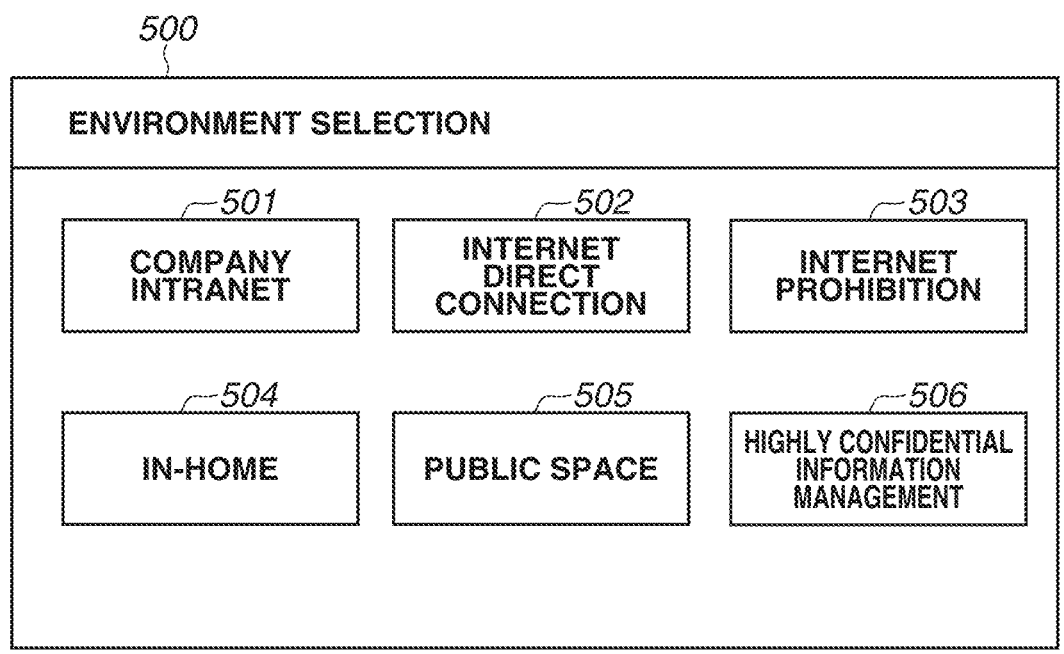
FIG. 5 is a diagram illustrating an example of a screen for allowing a user to select a use environment of the MFP.
Figure 6:
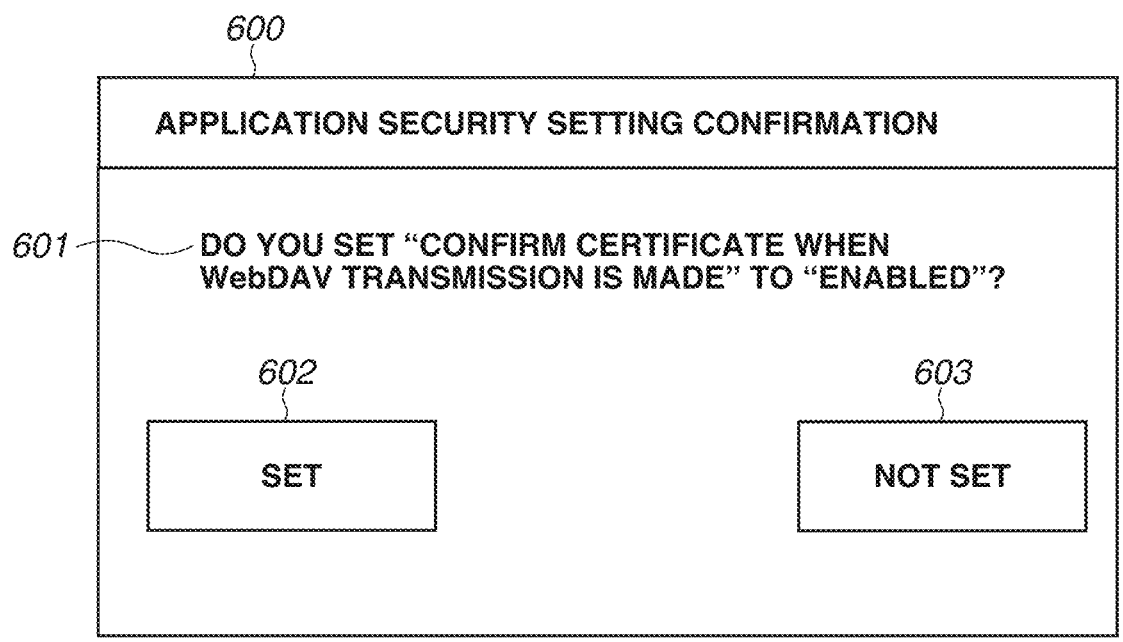
FIG. 6 is a diagram illustrating an example of a confirmation screen for inquiring of the user about whether to apply an optional security setting.

Next, with reference to FIGS. 5 and 6, a description is given of screens displayed on the operation unit 102 in the present exemplary embodiment. FIG. 5 illustrates a screen 500 for selecting the use environment of the MFP 100. In the present exemplary embodiment, one of six environments, i.e., use environments 501 to 506, is selected as the use environment of the MFP 100. Options for the use environment displayed on the screen 500 correspond to the use environments associated with the security templates saved in the data storage unit 202. The setting values corresponding to the setting items included in the essential security template associated with the environment selected on the screen 500 by the user are collectively applied to the MFP 100. Regarding the optional security template associated with the environment selected on the screen 500 by the user, a screen 600 is displayed to confirm whether to apply the recommended setting value for each of the setting items included in the template.

The options for the use environment of the MFP 100 according to the present exemplary embodiment are described. An option 501 is "company intranet" and is an environment where the MFP 100 is connected to the Internet via a firewall in an office. An option 502 is "Internet direct connection" and is an environment where the MFP 100 is directly connected to the Internet without a firewall. An option 503 is "Internet prohibition" and is an environment where the MFP 100 is not connected to the Internet. An option 504 is "in-home" and is an environment where the MFP 100 is connected externally to an in-home network or a wireless access point. An option 505 is "public space" and is an environment where many and unspecified people use the MFP 100, such as a shared office. An option 506 is "highly confidential information management" and is an environment where the highest priority is given to the security of the MFP 100. The above environments are merely used to describe the present exemplary embodiment, and another environment may exist.

FIG. 6 illustrates the screen 600. A label 601 is a label that displays a message for confirming whether to apply the recommended setting value for each of the setting items based on the optional security template associated with the environment selected on the screen 500 by the user. For example, in FIG. 6, a message for confirming with the user whether to set the setting value to "enabled" for the setting item "confirm certificate when WebDAV transmission is made" is displayed. A button 602 is a "set" button and is a button for the user to give an instruction to apply the setting displayed in the label 601. A button 603 is a "not set" button and is a button for the user to give an instruction not to apply the setting displayed in the label 601. Since the screen 600 is displayed for each of the setting items included in the optional security template, as many screens as the number of setting items included in the template are displayed with the wording of the label 601 changed. Alternatively, a configuration may be employed in which a "details" button (not illustrated) is prepared, and if the "details" button is pressed, a description regarding the setting item displayed in the label 601 and the purpose of changing the setting to the recommended setting value are displayed.

Figure 7:
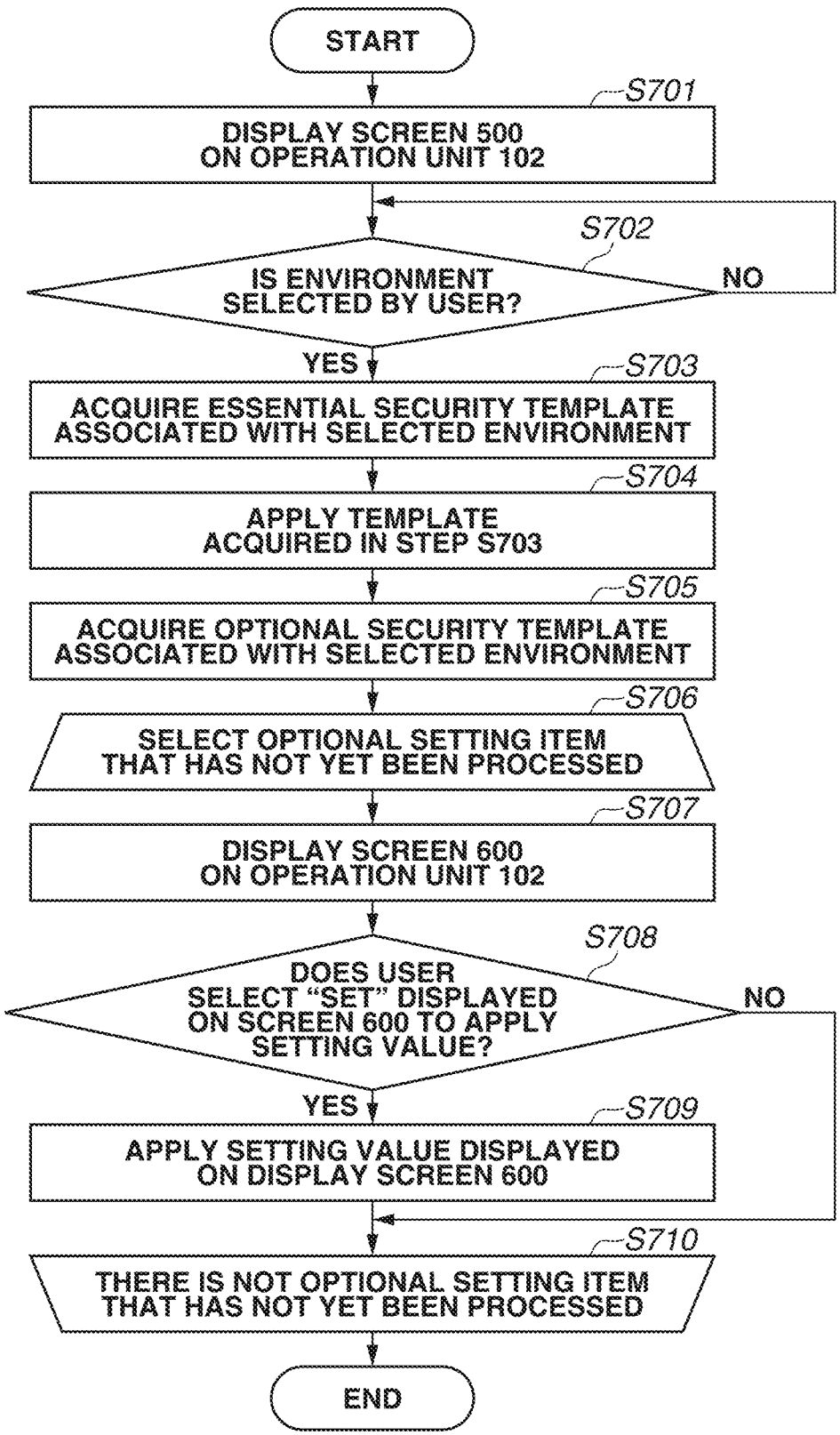
FIG. 7 is a flowchart illustrating an example of a security setting process according to first and fourth exemplary embodiments.

With reference to FIG. 7, the process of applying security templates is described. Operations (steps) illustrated in a flowchart in FIG. 7 are implemented by the CPU 111 loading programs for implementing the control units stored in the ROM 112 or the HDD 114 into the RAM 113 and executing the programs. If the operation control unit 201 detects that the user presses a button for displaying the screen 500 on a menu screen (not illustrated) displayed on the operation unit 102, the processing illustrated in FIG. 7 is started.

In step S701, the operation control unit 201 displays the screen 500 on the operation unit 102, and the processing proceeds to step S702. In step S702, if the operation control unit 201 detects that the environment is selected on the screen 500 by the user (YES in step S702), the processing proceeds to step S703. If the operation control unit 201 does not detect that the environment is selected on the screen 500 by the user (NO in step S702), step S702 is repeated. In step S703, the security setting control unit 203 acquires the template associated with the environment selected by the user in step S702 from among the essential security templates stored in the data storage unit 202. In step S704, the security setting control unit 203 applies the template acquired in step S703 to the MFP 100.

Next, in step S705, the security setting control unit 203 acquires the template associated with the environment selected by the user in step S702 from among the optional security templates stored in the data storage unit 202. In steps S706 to S710, the security setting control unit 203 executes a loop process for each of the setting items included in the template acquired in step S705. In step S706, the security setting control unit 203 selects a single item that has not yet been processed among the setting items included in the template acquired in step S705. In step S707, the operation control unit 201 displays the screen 600 on the operation unit 102. At this time, the label 601 indicates the setting item selected in step S706 and the recommended setting value for the setting item. In step S708, if the "set" button is selected on the screen 600 by the user (YES in step S708), the processing proceeds to step S709. If the "not set" button is selected (NO in step S708), the processing proceeds to step S710. In step S709, the security setting control unit 203 applies the setting value of the setting item indicated in the label 601 to the MFP 100. In step S710, if there is not a setting item that has not yet been processed among the setting items included in the template acquired in step S705, the loop process ends.

By the above processing, the user can easily make security settings that are required to be made by only selecting the use environment. If a security setting is recommended to be made, and the user should determine whether to make the security setting while confirming the security setting, the user selects whether to make the security setting on a confirmation screen and thereby can easily make the security setting.

In the first exemplary embodiment, first, using the essential security templates illustrated in FIG. 3, all the setting items included in the template associated with the environment selected by the user are collectively applied to the MFP 100. Next, using the optional security templates illustrated in FIG. 4, the screen 600 is displayed for each of the setting items included in the template associated with the environment selected by the user, and all of the setting items are set.

In a second exemplary embodiment, a configuration is described in which app history is referenced, and templates are applied to an app that is used. Since settings are not made for an app that is not used in the foregoing configuration, it is possible to reduce the number of loops in steps S706 to S710 in the first exemplary embodiment. This can narrow down the content to be confirmed and therefore reduce the burden on the user.

In the present exemplary embodiment, it is also possible to design the MFP 100 to further include a configuration for allowing the user to select a function to be used and applying templates to the app that provides the selected function. Consequently, it is possible to apply templates to an app that has not yet been used and is not recorded in the app history, but is to be used in the future by the user.

It is also possible to design the MFP 100 to further include a configuration for, when an app for which settings are not made as an "app that is not used" starts, applying templates to the app. If an app is used in the state where appropriate security settings are not made, there is a possibility that the user becomes confused or becomes exposed to security risk. In the present exemplary embodiment, it is also possible to reduce such a possibility.

The hardware configuration of the MFP 100 according to the present exemplary embodiment is similar to that illustrated in FIG. 1 in the first exemplary embodiment. The software configuration of the MFP 100 according to the present exemplary embodiment is similar to that illustrated in FIG. 2 in the first exemplary embodiment, except that in the present exemplary embodiment, the app control unit 204 saves the history of apps that are used in the data storage unit 202. FIG. 8 illustrates an example of the app history. An item 801 is the date and time of use of an app. An item 802 is the app name. For example, information 803 indicates that a transmission app is used at 10:15 on Oct. 12, 2021. Although only the date and time of use and the name of the app that is used are recorded as the app history for simplicity in FIG. 8, information regarding a user who executes the app and what operation the app performs may also be recorded. For example, in the case of the transmission app, a transmission destination server address may be recorded. In the case of a fax app, a transmission destination telephone number or error information may be recorded. Based on the app history illustrated in FIG. 8, the security setting control unit 203 distinguishes an app that is used and an app that is not used. The specific distinction method will be described below in step S1101 in FIG. 11. Then, the security setting control unit 203 applies security templates to an app distinguished as an app that is used. The specific processing will be described below with reference to FIG. 11.

Figure 9:
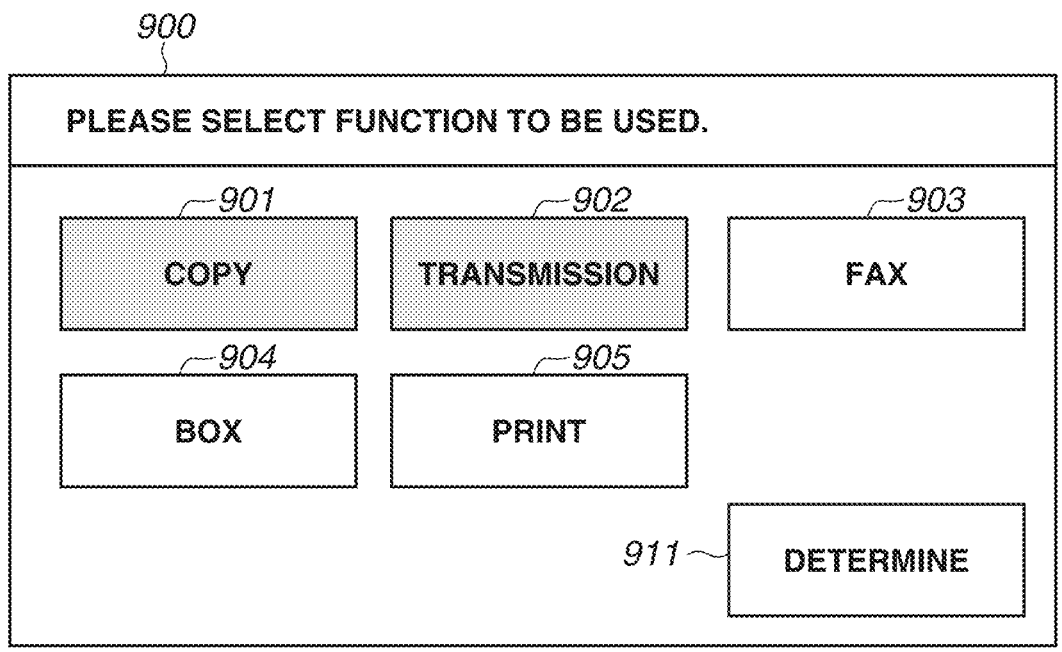
FIG. 9 is a diagram illustrating an example of a screen for allowing the user to select an application to be used in the second exemplary embodiment.

The screens 500 and 600 displayed on the operation unit 102 are also similar to those in the first exemplary embodiment. FIG. 9 illustrates a screen 900 displayed on the operation unit 102 in the present exemplary embodiment in addition to those in the first exemplary embodiment. The screen 900 is a screen for allowing the user to select a function to be used. The function to be used refers to a function that is not used at the current moment, but is to be used in the future. A function that is used at the current moment is identified based on the app history, and a function to be used in the future is selected on the screen 900 by the user. In the present exemplary embodiment, the user can select one or more functions from among functions 901 to 905. In FIG. 9, the copy function 901 and the transmission function 902 are selected by the user. The user presses a "determine" button 911, whereby the selection of the copy function 901 and the transmission function 902 is determined. Although the process of identifying a function that is used based on the app history illustrated in FIG. 8 will be described below, the screen 900 may be displayed in the state where the button for the function that is used that is identified by this process is selected in advance. Security templates are also applied to the apps that provide the functions selected and determined on the screen 900. The specific processing will be described below with reference to FIG. 11.

FIGS. 10A and 10B are examples of an app management table of the MFP 100. The app management table is a table used to, when an app for which settings are not made as an "app that is not used" starts, apply templates to the app. The specific processing will be described below with reference to FIG. 12. In FIGS. 10A and 10B, an item 1001 indicates the name of an app, and an item 1002 indicates whether the app is usable. If the app is unusable, an item 1003 indicates the cause of the unusable state. For example, in FIG. 10A, the transmission app, a box app, a copy app, and a print app B are usable. A fax app is unusable, and the cause of the unusable state is that a fax board required to cause the fax app to operate is not attached to the MFP 100. A print app A is also unusable, and the cause of the unusable state is that a license for enabling the print app A is not installed. FIG. 10B is an example where the app management table in FIG. 10A changes when the environment is selected on the screen 500 and settings are made in the state where the box app is not used in the MFP 100. The state 1002 of the box app changes from "usable" to "unused", and the cause 1003 indicates "unused". If it is determined that the box app is not used based on the app history illustrated in FIG. 8, and the function (the box function) provided by the box app is not selected on the screen 900 illustrated in FIG. 9, the app management table in FIG. 10A changes to the app management table in FIG. 10B. At this time, the security setting control unit 203 does not apply security templates to the app that provides the box function. The specific processing will be described below with reference to FIG. 11. As described above, the screen 900 may not be displayed, and the app management table may be changed by determining an app to which templates are to be applied, only by distinction between used and unused apps based on the app history illustrated in FIG. 8.

Figure 11:
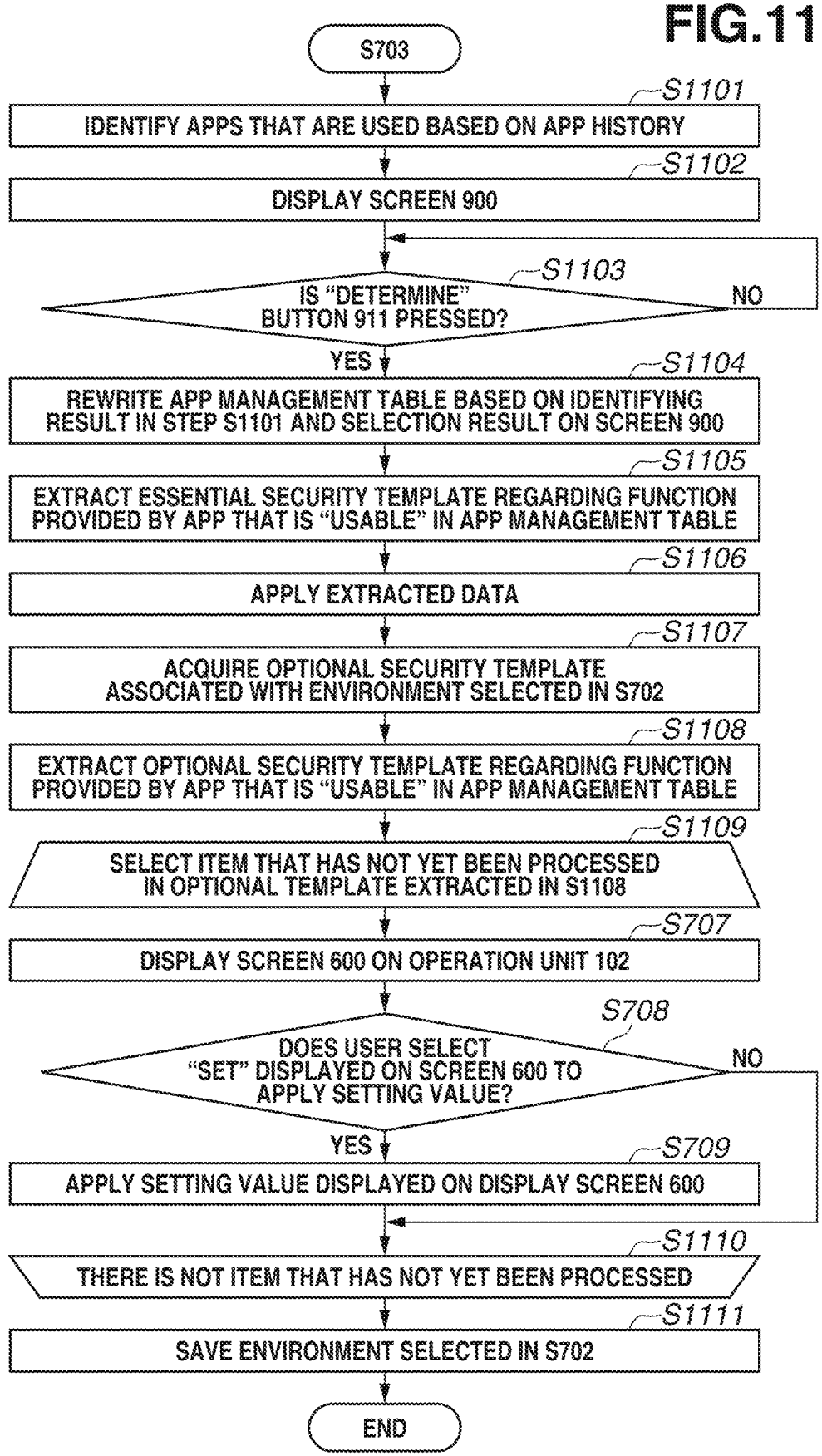
FIG. 11 is a flowchart illustrating an example of a security setting process according to the second exemplary embodiment.

With reference to FIG. 11, the process of applying security templates in the second exemplary embodiment is described. Operations (steps) illustrated in a flowchart in FIG. 11 are implemented by the CPU 111 loading programs for implementing the control units stored in the ROM 112 or the HDD 114 into the RAM 113 and executing the programs. The processes of steps S701 to S703 are similar to those in the first exemplary embodiment. In FIG. 11, the description starts from a step after step S703.

In step S1101, the security setting control unit 203 identifies apps that are used, based on the app history illustrated in FIG. 8. Specifically, the security setting control unit 203 confirms the app name 802 in the app history saved in the HDD 114. At this time, the security setting control unit 203 may identify the apps that are used by confirming the entire history, or may identify the apps that are used by confirming history of a particular period such as the past year. Alternatively, a form may be employed in which the date of final confirmation and an app that is used at this time are recorded in the data storage unit 202 so that the app history does not need to be confirmed each time. Then, when it is necessary to confirm the app history, only app history after the final confirmation date is confirmed, and an app that is newly used is added to the apps that are used.

Next, in step S1102, the operation control unit 201 displays the screen 900 on the operation unit 102, and the processing proceeds to step S1103. In step S1103, if the operation control unit 201 detects that the "determine" button 911 is pressed on the screen 900 by the user (YES in step S1103), the processing proceeds to step S1104. If the operation control unit 201 does not detect that the "determine" button 911 is pressed on the screen 900 by the user (NO in step S1103), step S1103 is repeated.

In step S1104, the security setting control unit 203 rewrites the app management table based on the apps that are used that are identified in step S1101 and the function to be used that is selected by the user in steps S1102 and S1103. Specifically, the security setting control unit 203 rewrites the state 1002 of an app that is neither the app that is used nor the app that provides the function to be used among apps of which the state 1002 is "usable" in the app management table to "unused". The security setting control unit 203 also sets the cause 1003 of the function to "unused".

In step S1105, the security setting control unit 203 extracts an essential security template regarding the function provided by an app that is "usable" in the app management table. Specifically, the security setting control unit 203 extracts setting items and setting values regarding the corresponding function from the essential security template acquired in step S703. Then, in step S1106, the security setting control unit 203 applies the template extracted in step S1105 to the MFP 100.

In step S1107, the security setting control unit 203 acquires the optional security template associated with the environment selected in step S702. Next, in step S1108, the security setting control unit 203 extracts an optional security template regarding the function provided by the app that is "usable" in the app management table. Specifically, the security setting control unit 203 extracts setting items and setting values regarding the corresponding function from the optional security template acquired in step S1107. Then, in steps S1109 to S1111, the security setting control unit 203 executes a loop process for each of the setting items included in the template extracted in step S1108. In step S1109, the security setting control unit 203 selects a single item that has not yet been processed among the setting items included in the template extracted in step S1108. The processes of steps S707 to S709 are similar to those in the first exemplary embodiment. In step S1110, if there is not a setting item that has not yet been processed among the setting items included in the template extracted in step S1108, the loop process ends.

In step S1111, the security setting control unit 203 saves the environment selected by the user in step S702 in the HDD 114. By the above processing, security templates are applied to the MFP 100.

Next, with reference to FIG. 12, a description is given of processing executed when an app starts after the environment is selected in step S702. Particularly, according to this processing, if an "app that is not used" is started, templates can be applied to the app. Operations (steps) illustrated in a flowchart in FIG. 12 are implemented by the CPU 111 loading programs for implementing the control units stored in the ROM 112 or the HDD 114 into the RAM 113 and executing the programs. Using as a trigger the event that the operation control unit 201 detects that the user performs the operation of selecting the environment on the operation unit 102 in step S702, the programs for executing the flowchart illustrated in FIG. 12 are enabled.

In step S1201, the app control unit 204 starts an app. In step S1202, the security setting control unit 203 determines whether the state of the app started in step S1201 is "unused" or "unusable". Specifically, the app control unit 204 makes the determination using the app management table illustrated in FIGS. 10A and 10B. First, the app control unit 204 searches the app name 1001 in the app management table for the app name of the app started in step S1201. Then, the app control unit 204 acquires the state 1002 of the app corresponding to the searched app name and determines whether the app is "unused" or "unusable". If the security setting control unit 203 determines that the app is "unused" or "unusable" (YES in step S1202), the processing proceeds to step S1204. If the security setting control unit 203 determines otherwise, i.e., if the security setting control unit 203 determines that the app is "usable" (NO in step S1202), the processing in this flowchart ends.

In step S1204, the security setting control unit 203 displays on the operation unit 102 a confirmation screen (not illustrated) for confirming whether to apply security templates to the app that is "unused" or "unusable", and receives the result of an input provided by the user. In step S1205, if the security setting control unit 203 receives "apply" as the result of the selection made by the user (YES in step S1205), the processing proceeds to step S1206. If the security setting control unit 203 receives "not apply" (NO in step S1205), the processing in this flowchart ends. At this time, the app may be forcibly terminated as illustrated in step S1208. This can prevent a general user from using the app without applying app security templates. Alternatively, the app may be prevented from being forcibly terminated according to authority. For example, if an administrator is logged in, step S1208 may be omitted so that the app is not forcibly terminated.

In step S1206, the security setting control unit 203 applies security templates to the app. Specifically, first, the security setting control unit 203 acquires the essential security template and the optional security template associated with the environment saved in step S1111 from the data storage unit 202. Next, the security setting control unit 203 extracts setting items and setting values regarding the function provided by the app from each of the essential security template and the optional security template. The security setting control unit 203 applies the extracted essential security template to the MFP 100. Then, the security setting control unit 203 performs the processes of steps S1109, S707 to S709 and S1110 in FIG. 11 on the extracted optional security template.

Finally, in step S1207, the security setting control unit 203 sets the state 1002 of the app to "usable" and sets the cause 1003 of the app to blank in the app management table.

By the above processing, the user can easily make security settings suitable for the use environment for an app that is used, only by selecting the use environment. Further, only by selecting an app to be used in the future, the user can easily make security settings suitable for the use environment for the app to be used. When an app for which settings are not made at this time starts, the user can easily further make security settings suitable for the use environment for the app.

In a third exemplary embodiment, a configuration is described in which the setting items included in an optional security template are classified into several categories. Then, instead of the screen 600 for confirming with the user whether to apply the setting for each of the setting items, a screen 1400 for confirming with the user whether to apply the settings for each of the categories is displayed. The hardware configuration and the software configuration of the MFP 100 are similar to those in the first exemplary embodiment, and therefore are not described.

Similarly to the first exemplary embodiment, the essential security templates illustrated in FIG. 3 are stored in the data storage unit 202. Instead of the optional security templates illustrated in FIG. 4, templates illustrated in FIG. 13 are stored in the data storage unit 202. Specifically, the third exemplary embodiment is different from the first exemplary embodiment in that information regarding "type" is added.

Figure 14:
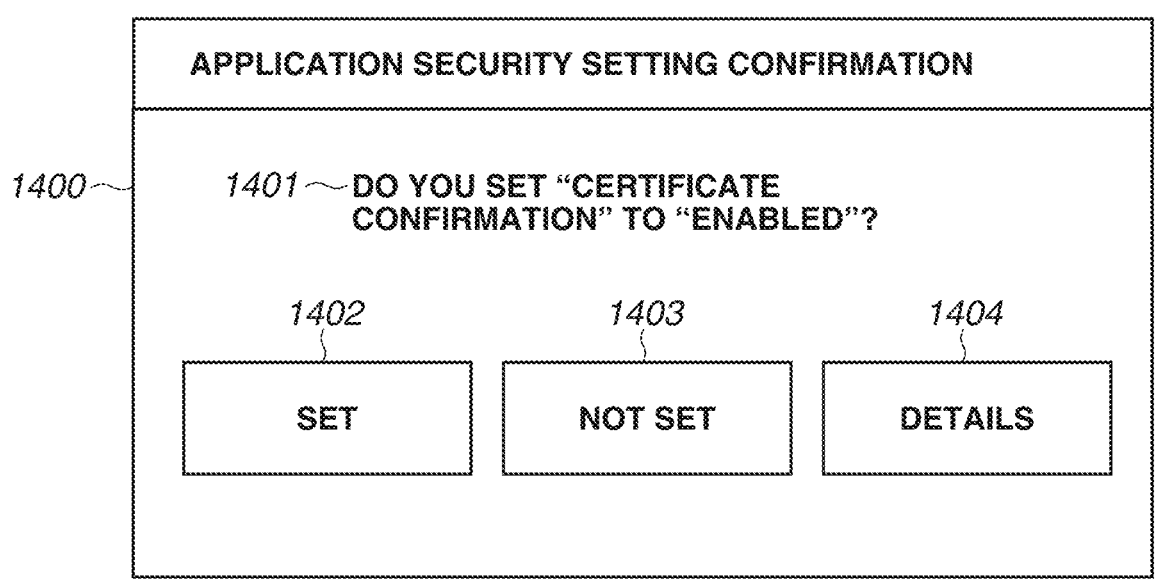
FIG. 14 is a diagram illustrating an example of a confirmation screen for inquiring of the user about whether to apply an optional security setting in the third exemplary embodiment.

Also in the third exemplary embodiment, similarly to the first exemplary embodiment, the screen 500 illustrated in FIG. 5 is displayed on the operation unit 102 by the operation control unit 201 and receives the selection of the environment from the user. As a confirmation screen displayed on the operation unit 102 by the operation control unit 201 when an optional security template is set, as described above, the screen 1400 illustrated in FIG. 14 is displayed instead of the screen 600 illustrated in FIG. 6. A label 1401 is a label that displays a message for inquiring of the user whether to apply the setting values of the template to optional setting items corresponding to a type "certificate confirmation". A button 1402 is a "set" button, and a button 1403 is a "not set" button. If the button 1402 is selected by the user, the setting items corresponding to the type "certificate confirmation" in the optional security template associated with the environment selected on the screen 500 are collectively set to the recommended setting values. A button 1404 is a "details" button. If the button 1404 is selected, a setting screen for individually setting the setting items to be collectively set on the screen 1400 is displayed on the operation unit 102. That is, a screen for enabling the setting items corresponding to the type "certificate confirmation" in the optional security template associated with the environment selected on the screen 500 to be set one by one is displayed on the operation unit 102. With this configuration, it is also possible to individually set a desired setting value, instead of collectively setting values depending on the type.

The process of applying security templates is almost similar to that in FIG. 7 described in the first exemplary embodiment. The third exemplary embodiment is different from the first exemplary embodiment in that in steps S706 to S710, the loop process is executed for each setting item in the first exemplary embodiment, while the loop process is executed for each type in the present exemplary embodiment.

By the above processing, if a security setting is recommended to be made, and the user should determine whether to make the security setting while confirming the security setting, the user selects whether to make the security setting on a confirmation screen and thereby can easily make the security setting. At this time, as compared to the first exemplary embodiment in which setting items are confirmed one by one, several setting items can be collectively confirmed in the present exemplary embodiment. Thus, it is possible to reduce the burden on the user.

In the first to third exemplary embodiments, a configuration has been described in which the MFP 100 performs the control. In a fourth exemplary embodiment, a configuration is described in which an information processing apparatus such as a cloud system performs the control. The determination of whether to perform the control using a cloud system or an edge device is made taking into account the balance between component cost related to the calculation resource of the edge device and the required response speed. Thus, an appropriate configuration differs for each solution to be applied.

Figure 15:
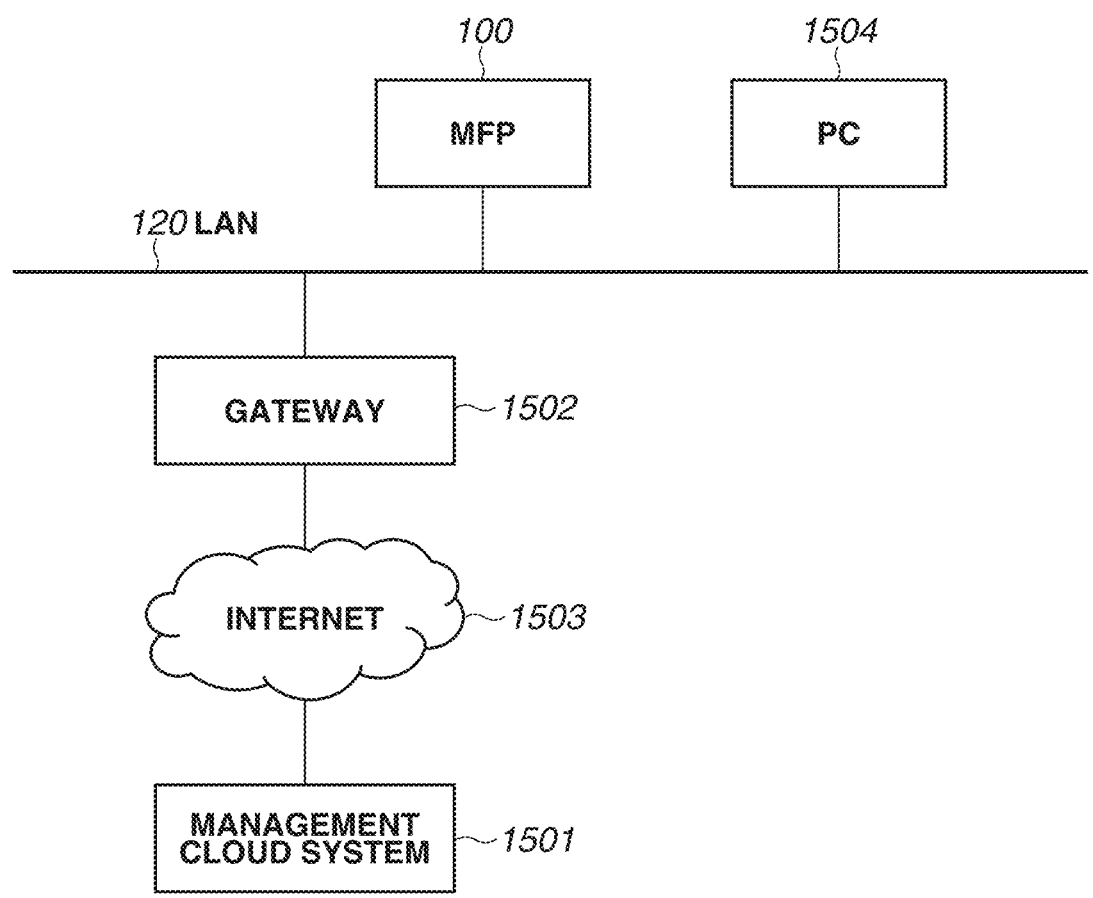
FIG. 15 is a diagram illustrating an example of a communication system according to the fourth exemplary embodiment.

FIG. 15 is a diagram illustrating an example of a communication system according to the present exemplary embodiment. The MFP 100 and a management cloud system 1501 are connected together via the LAN 120, a gateway 1502, and the Internet 1503. The management cloud system 1501 is a server that collects information from the MFP 100 and remotely monitors the state of the MFP 100.

The gateway 1502 is a network router that relays communication between the MFP 100 and the Internet 1503. The MFP 100 and a PC 1504 are connected together via the LAN 120.

Figure 16:
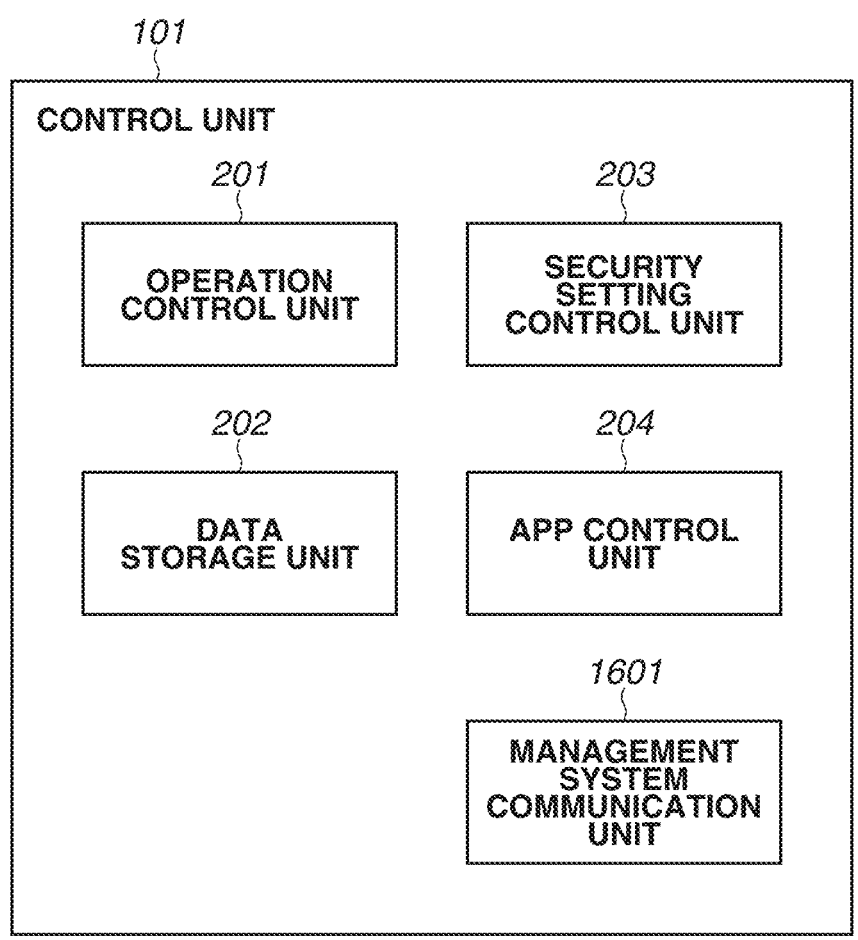
FIG. 16 is a diagram illustrating a software configuration of an MFP according to the fourth exemplary embodiment.

The hardware configuration of the MFP 100 is similar to that in FIG. 1 described in the first exemplary embodiment. FIG. 16 illustrates the software configuration of the MFP 100, and a management system communication unit 1601 is included in addition to the components in FIG. 2 described in the first exemplary embodiment. The management system communication unit 1601 transmits and receives information to and from the management cloud system 1501 and the MFP 100. Specifically, if the MFP 100 changes a setting, the management system communication unit 1601 notifies the management cloud system 1501 that the MFP 100 changes the setting. By this processing, the management cloud system 1501 can identify the settings with which the MFP 100 is operating. The management system communication unit 1601 of the MFP 100 also has the function of receiving a notification of an instruction issued by the management cloud system 1501 to change a setting and performing the process of changing the setting. As described above, in the present exemplary embodiment, information regarding the MFP 100 is synchronized in both directions, whereby the management cloud system 1501 can appropriately confirm or change the information regarding the MFP 100.

Figure 17:
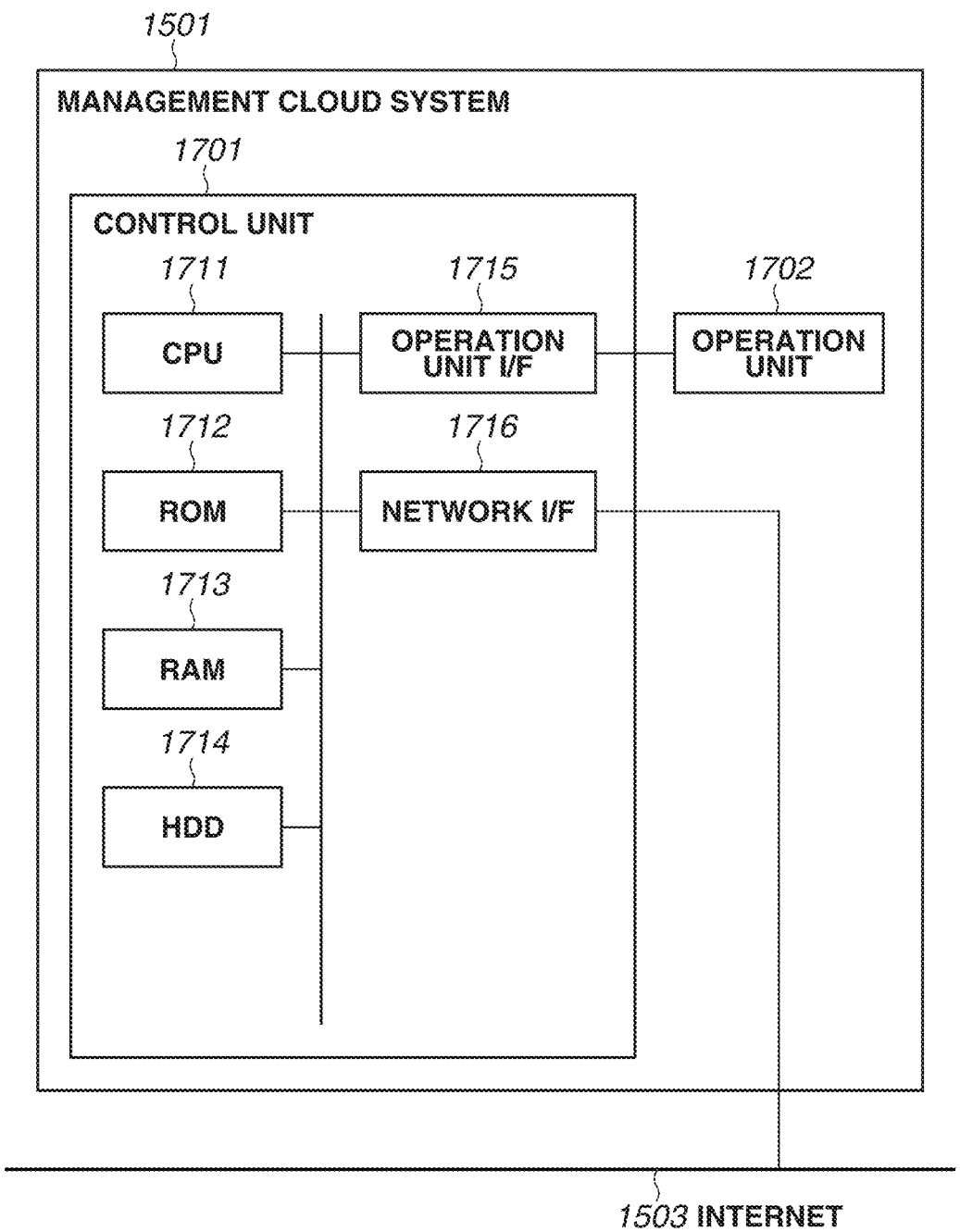
FIG. 17 is a diagram illustrating a hardware configuration of a management cloud system according to the fourth exemplary embodiment.

Next, with reference to FIG. 17, the hardware configuration of the management cloud system 1501 is described. A control unit 1701 including a CPU 1711 controls the entirety of the management cloud system 1501. A ROM 1712 is used to store programs to be executed by the CPU 1711. A RAM 1713 is used to temporarily hold data to be used by the CPU 1711. An HDD 1714 stores various programs and various pieces of setting information. Pieces of hardware such as the CPU 1711, the ROM 1712, the RAM 1713, and the HDD 1714 thus form a so-called computer. An operation unit I/F 1715 connects an operation unit 1702 and the control unit 1701. A network I/F 1716 is connected to the Internet 1503.

Figure 18:
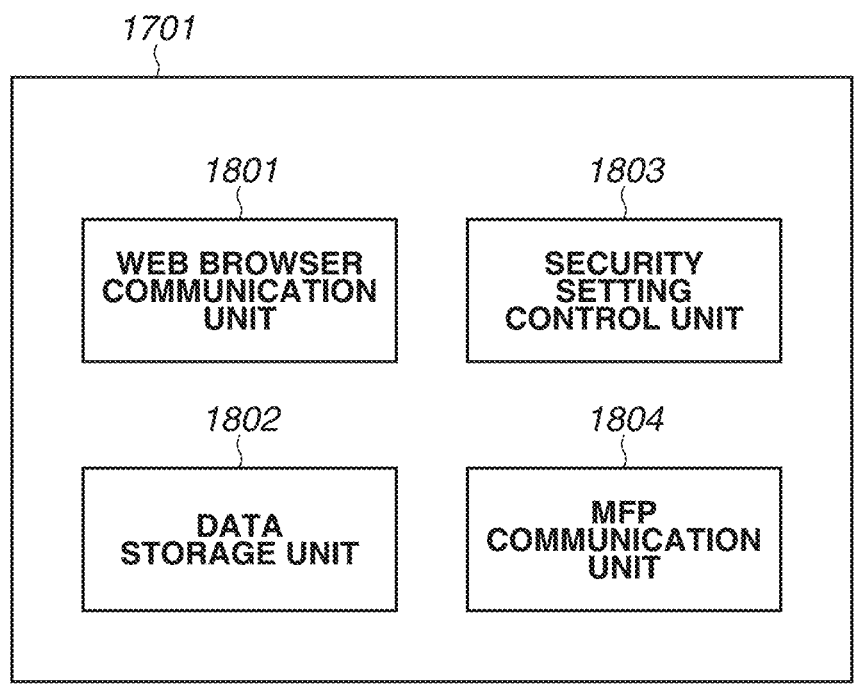
FIG. 18 is a diagram illustrating a software configuration of the management cloud system according to the fourth exemplary embodiment.

With reference to FIG. 18, the software configuration of the management cloud system 1501 is described. Components illustrated in FIG. 18 are implemented by the CPU 1711 executing programs according to the present disclosure stored in the ROM 1712.

A web browser communication unit 1801 displays a screen for the user in response to a request from a web browser operating on the PC 1504. The web browser communication unit 1801 also detects an operation of the user, and switches the screen or updates the display based on the result of the detection.

A data storage unit 1802 stores data in a distributed resource on a cloud or reads data from the distributed resource in response to a request from another control unit. For example, in a case where the user wishes to change some device setting, first, the user transmits the content of the change to the web browser communication unit 1801. Then, according to a request from the web browser communication unit 1801, the data storage unit 1802 saves the transmitted content as a setting value in the distributed resource on the cloud. Further, the data storage unit 1802 also stores the security templates illustrated in FIGS. 3 and 4.

Based on an operation of the user on the web browser detected by the web browser communication unit 1801, a security setting control unit 1803 controls an instruction regarding security settings to be transmitted to the MFP 100.

An MFP communication unit 1804 controls communication with the MFP 100. If the MFP communication unit 1804 receives a setting value of the MFP 100, the MFP communication unit 1804 stores the setting value in the data storage unit 1802. If the management cloud system 1501 gives an instruction to change a setting, the MFP communication unit 1804 transmits the instruction to change the setting to the MFP 100.

In the first exemplary embodiment, a case has been described where the screens 500 and 600 are displayed on the operation unit 102 of the MFP 100. In the present exemplary embodiment, the screens 500 and 600 are displayed on the PC 1504. A description is given of the process of displaying the screens 500 and 600 on the PC 1504 and applying security settings according to an instruction from the user. The flow of this processing is similar to that in FIG. 7 and therefore is described with reference to FIG. 7. Processes are executed by the management cloud system 1501 instead of the MFP 100. In the fourth exemplary embodiment, operations (steps) illustrated in the flowchart in FIG. 7 are implemented by the CPU 1711 loading programs for implementing the control units stored in the ROM 1712 or the HDD 1714 into the RAM 1713 and executing the programs.

Using as a trigger the event that the web browser communication unit 1801 receives an acquisition request to acquire the screen 500 from the web browser operating on the PC 1504, the processing illustrated in FIG. 7 is started. For example, the user presses a button for displaying the screen 500 on a menu screen (not illustrated) displayed on the web browser operating on the PC 1504. The web browser having detected this operation transmits an acquisition request to acquire the screen 500 to the web browser communication unit 1801.

In step S701, the web browser communication unit 1801 provides the screen 500 to the web browser operating on the PC 1504. As a result, the screen 500 illustrated in FIG. 5 is displayed on the web browser operating on the PC 1504.

In step S702, if the use environment of the MFP 100 is selected on the screen 500 by the user, the web browser having detected this operation transmits the result of the selection to the web browser communication unit 1801. Although a configuration is illustrated in which the user selects the environment of the MFP 100 in this flowchart, the present disclosure is not limited to this so long as the use environment of the MFP 100 can be identified. For example, the use environment may be estimated from the situation where the MFP 100 is installed, and the environment may be identified. If the web browser communication unit 1801 receives the result of the selection made by the user (YES in step S702), the processing proceeds to step S703. If the web browser communication unit 1801 does not receive the result of the selection made by the user (NO in step S702), step S702 is repeated.

In step S703, the security setting control unit 1803 acquires the template associated with the environment selected by the user in step S702 from among the essential security templates stored in the data storage unit 1802.

In step S704, the MFP communication unit 1804 transmits to the MFP 100 an instruction to apply the template acquired by the security setting control unit 1803 in step S703 to the MFP 100. At this time, the management system communication unit 1601 of the MFP 100 receives the instruction to apply the settings from the management cloud system 1501 via the network I/F 118. Based on the setting data received by the management system communication unit 1601, the security setting control unit 203 of the MFP 100 changes the settings of the MFP 100. Although omitted in this flowchart for simplicity, the MFP 100 may determine whether the settings are correctly made, and if the settings are not correctly made, the MFP 100 may perform a retry or perform an error process.

In step S705, the security setting control unit 1803 acquires the template associated with the environment selected by the user in step S702 from among the optional security templates stored in the data storage unit 1802.

In step S706, the security setting control unit 1803 executes a loop process for each of the setting items included in the optional template acquired in step S705. In step S706, the security setting control unit 1803 selects a single item that has not yet been processed among the setting items acquired in step S705.

In step S707, the web browser communication unit 1801 transmits the setting item selected in step S706 and the screen 600 indicating the recommended setting value for the setting item to the web browser operating on the PC 1504. As a result, the screen 600 illustrated in FIG. 6 is displayed on the web browser.

In step S708, if the "set" button or the "not set" button is selected on the screen 600 by the user, the web browser having detected this operation transmits the result of the selection to the web browser communication unit 1801. If the web browser communication unit 1801 receives the result of selecting the "set" button by the user (YES in step S708), the processing proceeds to step S709. If the web browser communication unit 1801 receives the result of selecting the "not set" button by the user (NO in step S708), the processing proceeds to step S710.

In step S709, the MFP communication unit 1804 transmits to the MFP 100 an instruction to apply the recommended setting value to the setting item of the MFP 100 selected in step S706. At this time, the management system communication unit 1601 of the MFP 100 receives the instruction to apply the setting from the management cloud system 1501 via the network I/F 118. Then, based on the setting item and the setting value received by the management system communication unit 1601, the security setting control unit 203 of the MFP 100 changes the setting of the MFP 100. In step S710, if there is not a setting item that has not yet been processed among the setting items acquired in step S705, the loop process ends.

By the above processing, the setting control in the first exemplary embodiment can also be performed by a cloud system instead of the MFP 100.

In a fifth exemplary embodiment, a configuration is described in which, first, system security templates are applied, and next, app security templates are applied. The hardware configuration and the software configuration of the MFP 100 are similar to those in the first exemplary embodiment, and therefore are not described.

The app security templates according to the present exemplary embodiment refer to the two types of templates described with reference to FIGS. 3 and 4 in the first exemplary embodiment. The system security templates (not illustrated) are used to collectively make settings related to the system in general such as the network according to the use environment of the MFP 100. The system security templates each refer to a setting data group obtained by collecting a plurality of setting items and setting values in association with the same use environment 301 as app security templates. Examples of the setting items include an authentication setting and a firewall setting. Some of the system security templates may include a setting item regarding any of installable apps.

The system security templates and the two types of app security templates are stored in the data storage unit 202.

Similarly to the first exemplary embodiment, screens displayed on the operation unit 102 are the screen 500 illustrated in FIG. 5 and the screen 600 illustrated in FIG. 6.

Figure 19:
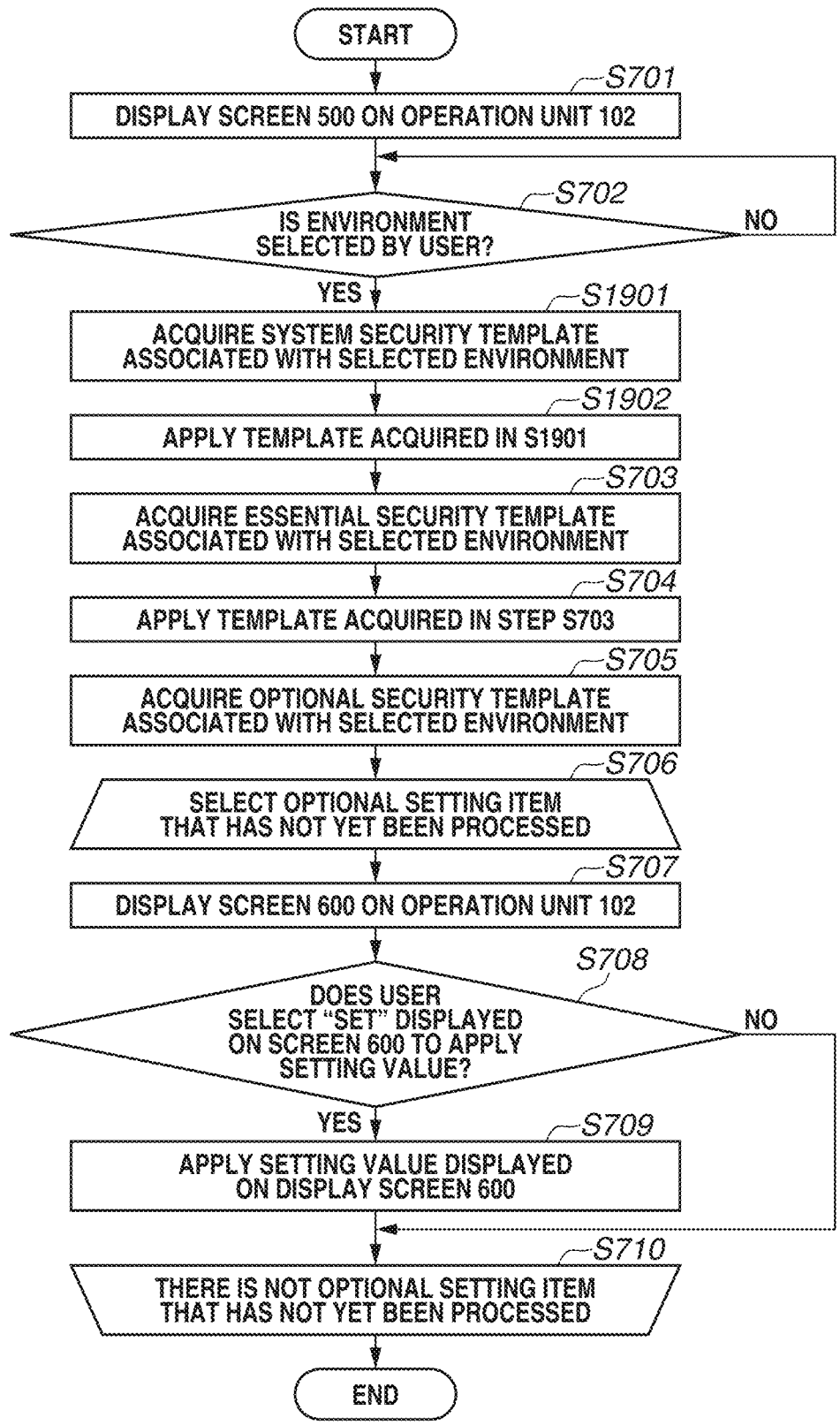
FIG. 19 is a flowchart illustrating an example of a security setting process according to a fifth exemplary embodiment.

With reference to a flowchart illustrated in FIG. 19 instead of FIG. 7, a setting process is described. Operations (steps) illustrated in the flowchart in FIG. 19 are implemented by the CPU 111 loading programs for implementing the control units stored in the ROM 112 or the HDD 114 into the RAM 113 and executing the programs. In the flowchart illustrated in FIG. 19, steps S1901 and S1902 are added between steps S702 and S703 in the flowchart illustrated in FIG. 7. In step S702, if the operation control unit 201 detects that the environment is selected on the screen 500 by the user (YES in step S702), the processing proceeds to step S1901. In step S1901, the security setting control unit 203 acquires the template associated with the environment selected by the user in step S702 from among the system security templates stored in the data storage unit 202. In step S1902, the security setting control unit 203 applies the template acquired in step S1901 to the MFP 100. Then, the processing proceeds to step S703. The subsequent processing is similar to that in the first exemplary embodiment.

By the above processing, the user can set the MFP 100 using a total of three types of templates, i.e., the system security templates and the essential and optional app security templates.

It is also possible to add step S1903 between steps S1902 and S703 in FIG. 19 and display on the operation unit 102 a screen (not illustrated) for confirming with the user whether to apply the essential and optional app security templates. If the user selects "apply" on this screen, the operation control unit 201 detects the selection, and the processing proceeds to step S703. Then, the subsequent processing is performed as described above. If, on the other hand, the user selects "not apply" on this screen, the operation control unit 201 detects the selection, the processing in this flowchart ends without performing the subsequent processing.

With such a configuration, the user can select to apply the system security templates but not apply the app security templates after selecting the environment is selected in step S702. If the user responsibly takes care of security, this configuration produces an effect that the user can use apps more conveniently without applying the app templates.

In the present exemplary embodiment, a configuration is also possible in which, after the processes of steps S1902, S1903, and S703 are performed, the processes of steps S1101 to S1111 illustrated in FIG. 11 are performed. Consequently, also in the present exemplary embodiment, similarly to the second exemplary embodiment, it is possible to apply the app security templates to only an app of which the usage history is recorded or the app that provides the function selected on the screen 900. A configuration for this purpose is similar to that in the second exemplary embodiment.

As described above, settings are not made for an app that is not used, whereby it is possible to reduce the number of loops in steps S706 to S710 in the first exemplary embodiment. This can narrow down the content to be confirmed and therefore can reduce the burden on the user.

Further, similarly to the second exemplary embodiment, it is also possible to perform the processing illustrated in FIG. 12. If an app is used in the state where appropriate security settings are not made, there is a possibility that the user becomes confused or becomes exposed to security risk. In the present exemplary embodiment, it is also possible to reduce such a possibility.

In the present exemplary embodiment, it is also possible to provide step S1203, in which it is determined whether the app security templates are applied, between steps S1202 and S1204. In step S1203, the security setting control unit 203 determines whether the app security templates associated with the environment are applied to the MFP 100. Specifically, the security setting control unit 203 confirms whether information regarding the environment saved in step S1111 in FIG. 11 is recorded in the data storage unit 202. If the information regarding the environment is recorded, it is determined that the app security templates are applied. Then, the processing proceeds to step S1204, and the subsequent processing is performed. If the information regarding the environment is not recorded, it is determined that the app security templates are not applied. Then, the flow of processing ends.

Consequently, it is not necessary to confirm with the user whether to apply the essential and optional app security templates in step S1903 again in FIG. 12. Thus, it is possible to reduce the burden on the user.

Other Exemplary Embodiments

Embodiments of the present disclosure can also be achieved by the process of supplying a program for implementing one or more functions of the above exemplary embodiments to a system or an apparatus via a network or a storage medium, and of causing one or more processors of a computer of the system or the apparatus to read and execute the program. Embodiments of the present disclosure can also be achieved by a circuit (e.g., an application-specific integrated circuit (ASIC) or a field-programmable gate array (FPGA)) for implementing the one or more functions.

Based on the image processing apparatus according to the present disclosure, it is possible to assist in setting an image processing apparatus so that a setting value corresponding to a setting item included in the image processing apparatus is a setting value suitable for the use environment of the image processing apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-041323, filed Mar. 16, 2022, which is hereby incorporated by reference herein in its entirety.

What is claimed is:

1. An image processing apparatus comprising:
a storage storing at least one first optional setting item in association with a first use environment included in a plurality of use environments and storing at least one second optional setting item in association with a second use environment included in the plurality of use environments;
one or more processors; and
at least one memory storing executable instructions, which when executed by the one or more processors, cause the image processing apparatus to perform operations comprising:
receiving a selection of a use environment of the image processing apparatus from the plurality of use environments from a user;
setting the image processing apparatus using a plurality of setting values corresponding to the use environment identified by the selection; and
outputting, as a recommendation, one or more optional setting items,
wherein, in a case where the use environment identified by the selection is the first use environment, the outputting outputs the at least one first optional setting item that is stored in association with the first use environment and that is not included in a plurality of setting items corresponding to the set plurality of setting values corresponding to the first use environment, and
in a case where the use environment identified by the selection is the second use environment, the outputting outputs the at least one second optional setting item that is stored in association with the second use environment and that is not included in a plurality of setting items corresponding to the set plurality of setting values corresponding to the second use environment.

2. The image processing apparatus according to claim 1, wherein the storage further stores at least one first optional setting value corresponding to the at least one first optional setting item in association with the first use environment and stores at least one second optional setting value corresponding to the at least one second optional setting item in association with the second use environment, and wherein in a case where the use environment identified by the selection is the first use environment, the outputting outputs the at least one first optional setting value in addition to the at least one first optional setting item, and in a case where the use environment identified by the selection is the second use environment, the outputting outputs the at least one second optional setting value in addition to the at least one second optional setting item.

3. The image processing apparatus according to claim 2, wherein the executable instructions, when executed by the one or more processors, further cause the image processing apparatus to perform operations comprising:
second receiving from the user a selection regarding whether to set each of the at least one optional setting value output in the outputting for the image processing apparatus; and
differentiating, based on the selection received in the second receiving, whether to set the each of the at least one optional setting value.

4. The image processing apparatus according to claim 1, wherein the image processing apparatus has a plurality of functions, and
wherein the at least one first optional setting item and the at least one second optional setting item are setting items regarding the functions of the image processing apparatus.

5. The image processing apparatus according to claim 4, wherein the executable instructions, when executed by the one or more processors, further cause the image processing apparatus to perform operations comprising recording, regarding each of the plurality of functions, information indicating that the function is used,
wherein in a case where the use environment identified by the selection is the first use environment, the outputting outputs at least one setting item regarding the function recorded in the recording in the at least one first optional setting item, and in a case where the use environment identified by the selection is the second use environment, the outputting outputs at least one setting item regarding the function recorded in the recording in the at least one second optional setting item.

6. The image processing apparatus according to claim 5, wherein in a case where a function regarding which the information indicating that the function is used is not recorded in the recording starts in the image processing apparatus,
in a case where the use environment identified by the selection is the first use environment, the outputting outputs at least one setting item regarding the started function in the at least one first optional setting item, and in a case where the use environment identified by the selection is the second use environment, the outputting outputs at least one setting item regarding the started function in the at least one second optional setting item.

7. The image processing apparatus according to claim 4, wherein the executable instructions, when executed by the one or more processors, further cause the image processing apparatus to perform operations comprising second receiving a selection of at least one of the plurality of functions,
wherein in a case where the use environment identified by the selection is the first use environment, the outputting outputs at least one setting item regarding the function selected in the second receiving in the at least one first optional setting item, and in a case where the use environment identified by the selection is the second use environment, the outputting outputs at least one setting item regarding the function selected in the second receiving in the at least one second optional setting item.

8. The image processing apparatus according to claim 1, wherein the storage stores the at least one first optional setting item and the at least one second optional setting item by classifying each of the at least one first optional setting item and the at least one second optional setting item into a plurality of categories, and
wherein the outputting outputs at least one optional setting item for each of the categories.

9. The image processing apparatus according to claim 1, wherein the executable instructions, when executed by the one or more processors, further cause the image processing apparatus to perform operations comprising setting the image processing apparatus using a plurality of setting values regarding security of a network, the plurality of setting values corresponding to the use environment identified by the selection.

10. A control method for controlling an image processing apparatus including a storage storing at least one first optional setting item in association with a first use environment included in a plurality of use environments and storing at least one second optional setting item in association with a second use environment included in the plurality of use environments, the control method comprising:
receiving a selection of a use environment of the image processing apparatus from the plurality of use environments from a user;
setting the image processing apparatus using a plurality of setting values corresponding to the use environment identified by the selection; and
outputting, as a recommendation, one or more optional setting items,
wherein, in a case where the use environment identified by the selection is the first use environment, the outputting outputs the at least one first optional setting item that is stored in association with the first use environment and that is not included in a plurality of setting items corresponding to the set plurality of setting values corresponding to the first use environment, and
in a case where the use environment identified by the selection is the second use environment, the outputting outputs the at least one second optional setting item that is stored in association with the second use environment and that is not included in a plurality of setting items corresponding to the set plurality of setting values corresponding to the second use environment.

11. A non-transitory computer-readable storage medium that stores a computer program for executing a control method for controlling an image processing apparatus including a storage storing at least one first optional setting item in association with a first use environment included in a plurality of use environments and storing at least one second optional setting item in association with a second use environment included in the plurality of use environments, the control method comprising:
receiving a selection of a use environment of the image processing apparatus from the plurality of use environments from a user;
setting the image processing apparatus using a plurality of setting values corresponding to the use environment identified by the selection; and
outputting, as a recommendation, one or more optional setting items,
wherein, in a case where the use environment identified by the selection is the first use environment, the outputting outputs the at least one first optional setting item that is stored in association with the first use environment and that is not included in a plurality of setting items corresponding to the set plurality of setting values corresponding to the first use environment, and
in a case where the use environment identified by the selection is the second use environment, the outputting outputs the at least one second optional setting item that is stored in association with the second use environment and that is not included in a plurality of setting items corresponding to the set plurality of setting values corresponding to the second use environment.

* * * * *